United States Patent
Chen et al.

(10) Patent No.: US 9,648,318 B2
(45) Date of Patent: May 9, 2017

(54) PERFORMING RESIDUAL PREDICTION IN VIDEO CODING

(71) Applicant: QUALCOMM Incorporated, San Diego, CA (US)

(72) Inventors: Ying Chen, San Diego, CA (US); Krishnakanth Rapaka, San Diego, CA (US); Marta Karczewicz, San Diego, CA (US); Xiang Li, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 14/040,290

(22) Filed: Sep. 27, 2013

(65) Prior Publication Data

US 2014/0105299 A1 Apr. 17, 2014

Related U.S. Application Data

(60) Provisional application No. 61/708,011, filed on Sep. 30, 2012, provisional application No. 61/749,874, filed on Jan. 7, 2013.

(51) Int. Cl.
*H04N 19/597* (2014.01)
*H04N 19/30* (2014.01)
(Continued)

(52) U.S. Cl.
CPC ..... *H04N 19/00424* (2013.01); *H04N 19/105* (2014.11); *H04N 19/30* (2014.11);
(Continued)

(58) Field of Classification Search
CPC .......... H04N 19/00424; H04N 19/105; H04N 19/30; H04N 19/513; H04N 19/52; H04N 19/597
See application file for complete search history.

(56) References Cited

U.S. PATENT DOCUMENTS

2007/0201551 A1 8/2007 Wang et al.
2009/0290643 A1* 11/2009 Yang ................ H04N 19/00769
375/240.16
(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
(Continued)

*Primary Examiner* — Andy Rao
*Assistant Examiner* — Tyler Edwards
(74) *Attorney, Agent, or Firm* — Shumaker & Sieffert, P.A.

(57) ABSTRACT

In general, techniques are described for performing residual prediction in video coding. As one example, a device configured to code scalable or multi-view video data may comprise one or more processors configured to perform the techniques. The processors may determine a difference picture, for a current picture, based on a first reference picture in a same layer or view as the current picture and a decoded picture in a different layer or view as the current picture. The decoded picture may be in a same access unit as the first reference picture. The processors may perform bi-prediction based on the difference picture to code at least a portion of the current picture.

39 Claims, 12 Drawing Sheets

(51) Int. Cl.
H04N 19/105 (2014.01)
H04N 19/52 (2014.01)
H04N 19/513 (2014.01)

(52) U.S. Cl.
CPC ........... *H04N 19/513* (2014.11); *H04N 19/52* (2014.11); *H04N 19/597* (2014.11)

(56) References Cited

U.S. PATENT DOCUMENTS

2012/0063517 A1 3/2012 Choi et al.
2013/0148717 A1 6/2013 Yitschak et al.

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen et al., "AHG12: Hooks for temporal motion vector prediction and weighted prediction in HEVC multiview/3DV extension", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-I0353, XP020112116, 7 pp.
International Search Report and Written Opinion—PCT/US2013/062753—ISA/EPO—Feb. 5, 2014, 13 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jang et al., "SCE3: Inter prediction based on difference picture," Vidyo Inc. and LG Electronics, Joint Collaborative Team on Video Coding (JCT-VC) of ITU-T SG 16 WP 3 and ISO/IEC JTC 1/SC 29/WG 11, JCTVC-M0251, 13th Meeting: Incheon, KR, Apr. 18-26, 2013, 7 pp.
Li et al., "Generalized Inter-Layer Residual Prediction for Scalable Extension of HEVC," IEEE International Conference on Image Processing, Sep. 15-18, 2013, 4 pp.
Schwarz et al., "3D-HEVC-CE3 results on inter-view motion parameter prediction by HHI," MPEG Meeting—ISO/IEC JTC1/SC29/WG11, Doc. MPEG12/M23698, San Jose, USA, Feb. 2012, 10 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Zhang et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, 2nd Meeting: Shanghai, CN, Oct. 13-19, 2012, 4 pp.
Tech, et al., "MV-HEVC Working Draft 1," 1st Meeting, Stockholm, SE, Jul. 16-20, 2012, Document: JCT3V-A1004_d0, 20 pp.
International Preliminary Report on Patentability from International Application No. PCT/US2013/062753, dated Jan. 20, 2015, 9.
Schwarz, et al., "Test Model under Consideration for HEVC based 3D video coding v3.0", MPEG Meeting; Apr. 30-May 4, 2012; Geneva; (Motion Picture Expert Group or ISO/IEC JTC1/SC29/WG11), No. N12744, XP030019217, 46 pp.

* cited by examiner

PERFORMING RESIDUAL PREDICTION IN VIDEO CODING

This application claims the benefit of U.S. Provisional Application No. 61/708,011, filed Sep. 30, 2012, and U.S. Provisional Application No. 61/749,847, filed Jan. 7, 2013, each of which is hereby incorporated by reference in its entirety.

TECHNICAL FIELD

This disclosure relates to video coding and, more specifically, coding of multiview or scalable video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for multiview or scalable video coding. A video coding device (which may generally refer to a video encoder and/or a video decoder) that performs emerging video coding standards may perform a form of advanced residual prediction in a manner that avoids changes at a block level. In other words, the video coding device may perform a form of advanced residual prediction using previously defined bi-prediction, which is a motion compensation technique generally used to predict a current block from one or more reference blocks of a reference picture in a same or different layer or view than the current picture, without having to modify block level operation at base layers or views of the emerging video coding standard.

To illustrate, for a current picture in the current enhancement layer (which is a layer that augments a base layer in some manner), a video coder (which may refer to either or both of a video encoder and/or a video decoder) may calculate a difference picture based on a reference picture of the current layer and the co-located picture (which may be a picture in a same access unit) of the reference picture in its reference layer, e.g., base layer. The video coder may add the difference picture to a reference picture list of the current picture. The video coder may, in some examples, add the difference picture to the reference picture list multiple times, and each time as an entry with or without different processing/filtering. The video coder may then use this difference picture when coding the current picture. In this manner, the techniques may enable the video coder to perform a form of advanced residual prediction using previously defined bi-prediction without potentially having to modify a block level of emerging video coding standards.

In one aspect, a method of decoding scalable or multi-view video data comprises determining a difference picture, for a current picture, based on a first reference picture in a same layer or view as the current picture and a decoded picture in a different layer or view as the current picture, where the decoded picture is in a same access unit as the first reference picture. The method further comprises performing bi-prediction based on the difference picture to decode at least a portion of the current picture.

In another aspect, a method of encoding scalable or multi-view video data comprises determining a difference picture, for a current picture, based on a first reference picture in a same layer or view as the current picture and a decoded picture in a different layer or view as the current picture. The decoded picture is in a same access unit as the first reference picture. The method further comprises performing bi-prediction based on the difference picture to encode at least a portion of the current picture.

In another aspect, a device configured to code scalable or multi-view video data comprises one or more processors configured to determine a difference picture, for a current picture, based on a first reference picture in a same layer or view as the current picture and a decoded picture in a different layer or view as the current picture, where the decoded picture is in a same access unit as the first reference picture. The one or more processors may further be configured to perform bi-prediction based on the difference picture to code at least a portion of the current picture.

In another aspect, a device configured to code scalable or multi-view video data, the device comprises means for determining a difference picture, for a current picture, based on a first reference picture in a same layer or view as the current picture and a decoded picture in a different layer or view as the current picture, where the decoded picture is in a same access unit as the first reference picture, and means for performing bi-prediction based on the difference picture to code at least a portion of the current picture.

In another aspect, a non-transitory computer-readable storage medium has storing thereon instructions that, when executed, cause one or more processors of a device configured to code scalable or multi-view video data to determine a difference picture, for a current picture, based on a first reference picture in a same layer or view as the current picture and a decoded picture in a different layer or view as the current picture, where the decoded picture is in a same access unit as the first reference picture, and perform bi-prediction based on the difference picture to code at least a portion of the current picture.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
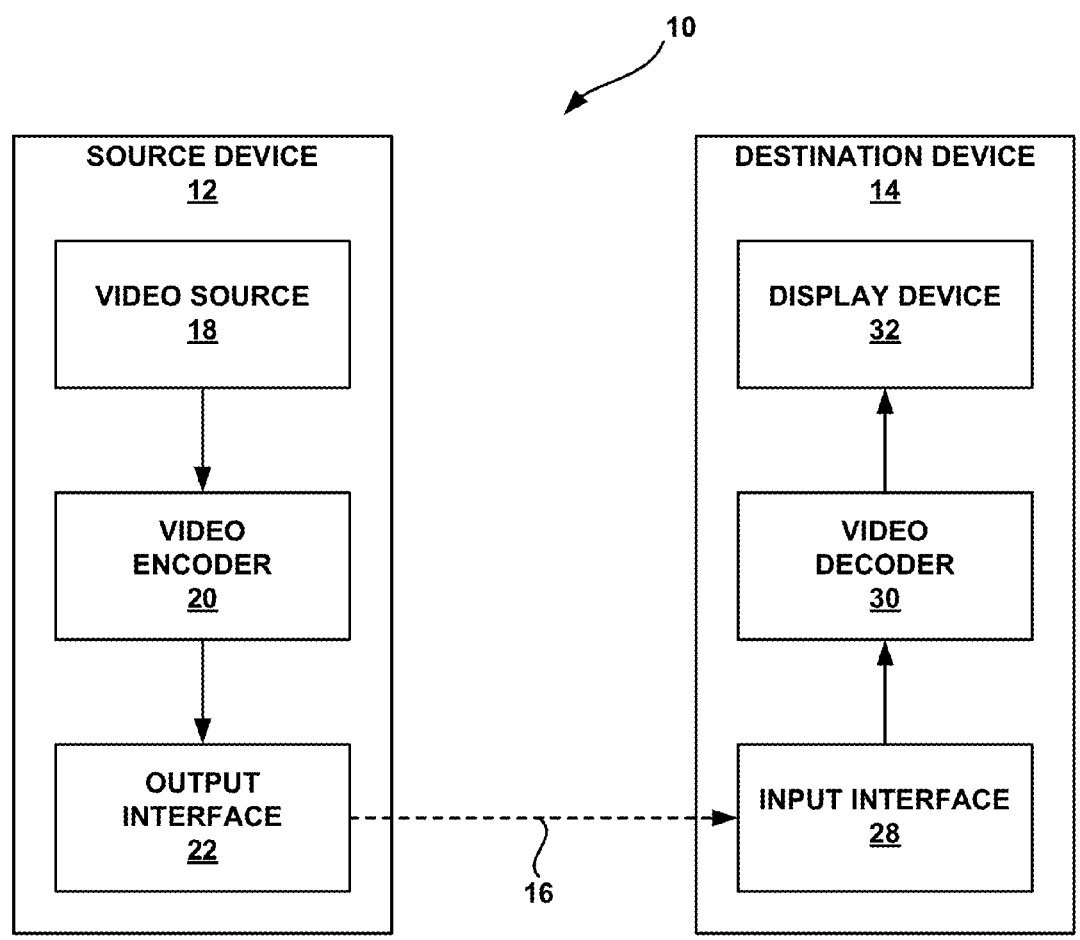
FIG. 1 is a block diagram illustrating an example video encoding and decoding system that may utilize the techniques described in this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard (referred to as "High Efficiency Video Coding" or "HEVC") being developed by the Joint Collaboration Team on Video Coding (JCT-VC) of ITU-T Video Coding Experts Group (VCEG) and ISO/IEC Motion Picture Experts Group (MPEG). The latest Working Draft (WD) of HEVC, and referred to as HEVC WD8 hereinafter, is available from http://phenix.int-evry.fr/jct/doc_end_user/documents/10_Stockholm/wg11/JCTVC-J1003-v8.zip, the entire content of which is incorporated by reference herein.

In most video coding standards, including those listed above, video data corresponds to a sequence of individual pictures played back at a relatively high frame rate. Video coders, such as video encoders and video decoders, typically utilize block-based video coding techniques. That is, video coders may divide each of the pictures into a set of individual blocks of video data, then code each individual block of the pictures.

Block-based video coding typically involves two general steps. The first step includes predicting a current block of video data. This prediction may be through the use of intra-prediction (that is, spatial prediction based on neighboring, previously coded blocks of the same picture) or inter-prediction (that is, temporal prediction based on one or more previously coded pictures). Performance of this prediction process generates a predictive block for the current block. The other step involves coding of a residual block. In general, the residual block represents pixel-by-pixel differences between the original, un-coded version of the current block and the predictive block. A video encoder forms the residual block by calculating the pixel-by-pixel differences, whereas a video decoder adds the residual block to the predictive block to reproduce the original block.

Multiview video data is generally used to produce a three-dimensional (3D) effect for a viewer. Pictures from two views (that is, camera perspectives from slightly different horizontal positions) may be displayed substantially simultaneously, such that one picture is seen by the viewer's left eye, and the other picture is seen by the viewer's right eye. Disparity between objects shown in the two pictures produces the 3D effect for the viewer.

Because the two pictures include similar information, multiview video coding techniques include inter-view prediction. That is, pictures of one view (a "base view") may be intra- and inter-predicted (that is, temporally inter-predicted), and pictures of a non-base view may be inter-view predicted relative to pictures of the base view. In inter-view prediction, disparity motion vectors may be used to indicate locations of reference blocks for a current block in a current view, relative to a reference picture in a base view (or other reference view). Non-base views used as reference views may be considered base views when coding a non-base view relative to the reference view.

Scalable video data is generally used to produce adaptive video data that may scale to accommodate changes in available bandwidth, differences between display capabilities (often, in terms of resolution) and differences between other capabilities of devices that may reproduce the scalable video data. Typically, a base layer refers to a first sequence of pictures having a first spatial resolution and higher layers, referred to as "enhancement layers," may provide additional video data that augments or otherwise complements the base layer to facilitate the scalability of the base layer (often, augmenting the base layer pictures to provide increased resolution, as one example).

Scalable video data, like multiview video data, may involve similar coding techniques as those described above with respect to multiview video data. Because the pictures of the base layer and the enhancement layer(s) include nearly similar information, scalable video coding techniques may also include inter-layer prediction. That is, pictures of a the base layer may be intra- and inter-predicted (that is, temporally inter-predicted), and pictures of the enhancement layer may be inter-layer predicted relative to pictures of the base layer. In inter-layer prediction, disparity motion vectors may be used to indicate locations of reference blocks for a current block in a current layer, relative to a reference picture in a base layer (or other reference layer). Non-base layers used as reference layers may be considered base layers when coding a non-base layer relative to the reference layer.

Focusing on scalable video coding (SVC) for purposes of illustration, processes have been proposed for performing what is referred to as a weighted difference domain uni-prediction for legacy video coding standards, such as a H.264 video coding standard. The weighted difference uni-prediction involves the computation of a difference signal (which also may be referred to as a "difference block"), where this difference signal is computed as a function of the current layer (which may be another way to refer to an enhancement layer (EL)) reconstructed signal and the corresponding base layer reconstructed signal. In particular, the difference signal is computed by subtracting the current layer reconstructed signal from the corresponding base layer reconstructed signal. The difference signal is then used to predict the residue of the current block, where this difference signal may be weighted before the difference signal is used as a prediction block of the residue (which may also be referred to as the residual block).

While the advanced residual prediction processes for both SVC and MVC may promote coding efficiency (or, in other words, better compress a given picture) in comparison to video coding processes that do not utilize advanced residual prediction processes, emerging video coding standards, such as the proposed high efficiency video coding (HEVC) standard, may have to be modified at the block level (or what is referred to as the "coding unit" level in HEVC terms) to support these advanced residual prediction processes for any SVC or MVC extension to the HEVC proposal. Block level changes may be required because the difference signal or block in some of the advanced residual prediction processes are derived on a block-by-block basis (hence the alternative name, "difference block" used to refer to this difference signal). Given that the HEVC proposal, for example, has generally finalized the block level signaling and design, the HEVC proposal may be unable to implement or perform the advanced residual prediction processes in the corresponding SVC and/or MVC extensions to the HEVC proposal, without modifying the adopted codec from the HEVC proposal.

In accordance with the techniques of this description, a video coding device (which may generally refer to a video encoder and/or a video decoder) that performs emerging video coding standards may be modified or otherwise adapted to perform a form of advanced residual prediction in a manner that avoids significant block level changes to the emerging video coding standards. In other words, the video coding device may perform a form of advanced residual prediction using previously defined bi-prediction, which as described below in more detail is a motion compensation technique generally used to predict a current block from one or more reference blocks of a reference picture in a same or different layer or view than the current picture.

In effect, the video coding device may perform this bi-prediction to predict a current block of a current picture in an enhancement layer in a manner that mimics application of advanced residual prediction. In this way, the techniques may adapt or otherwise modify bi-prediction to perform a picture-level form of advanced residual prediction that may not require significant modification of the block-level aspects of the HEVC or other emerging video coding standard proposals. The techniques may therefore enable video coding devices that adhere to emerging video coding standards to perform advanced residual prediction and thereby provide for additional compression efficiency in comparison to those video coding devices that are unable to perform advanced residual prediction.

FIG. 1 is a block diagram illustrating an example video encoding and decoding system 10 that may utilize techniques for temporal motion vector prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for temporal motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). The latest Working Draft (WD) of HEVC, Working Draft 9, is described in document HCTVC-L1003_d7, Bross et al., "Proposed editorial improvements for High Efficiency Video Coding (HEVC) Text Specification Draft 9 (SoDIS)," Joint Collaborative Team on Video Coding (JCT-VC) of ITU-T SG16 WP3 and ISO/IEC JTC1/SC29/WG11, 12th Meeting: Geneva, CH, January, 2013 is referred to as HEVC WD9 hereinafter and is available from http://phenix.int-evry.fr/jct/doc_end_user/documents/12_Geneva/wg11/JCTVC-L0030-v1.zip, the entire content of which is incorporated by reference herein. In some aspects, the techniques described in this disclosure may be applied to devices that generally conform to the H.264 and/or upcoming HEVC standard.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although techniques of this disclosure are described with respect to the H.264 standard and the upcoming HEVC standard, the techniques of this disclosure are generally applicable to any video coding standard.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To generate the predictive block using a form of inter-prediction referred to as "bi-prediction" (which refers to a bi-directional prediction often from two different reference frames), video encoder 20 may, for a current picture store a first set of reference pictures, which may be collectively referred to as a reference picture list zero (0), and a second set of reference pictures, which may be collectively referred to as a reference picture list one (1), where each of the lists include reference pictures may include reference pictures different from the reference pictures of the other list. Pictures that are included in these lists may be referred to as reference pictures in this disclosure, while pictures stored to a decoded picture buffer but that are not specified in either of the lists may be referred to as decoded pictures. All reference pictures may represent decoded pictures, while all decoded pictures may not represent reference pictures. In any event, video encoder 20 may select one or more reference pictures from reference picture list 0 and one or more reference pictures from reference picture list list 1. In this respect, video encoder 20 may determine at least two different reference pictures of the video data.

After selecting the reference pictures, video encoder 20 may perform either a default weighted prediction or an explicit weighted prediction (which also may be referred to as "weighted prediction" in this disclosure) to predict a predictive video block for the current block from at least two reference video blocks, each selected from a different one of the at least two different reference pictures. In some instances, the two reference pictures are temporally distant from the current picture. Likewise, the at least two reference video blocks are temporally distant from the current video block to be predicted. In other words, the reference pictures (and the reference video blocks selected form these reference pictures) of the reference picture list 0 may comprise reference pictures that occur temporally either before or after or both before and after the current picture for which the current block is to be predicted. Likewise, the reference picture (and the reference video blocks selected from these reference pictures) of the reference picture list 1 may comprise pictures that occur temporally either before or after or both before and after the current frame for which the current block is to be predicted.

Video encoder 20 may therefore select a first reference picture that occurs temporally before or after the current frame from reference picture list 0 and a second reference picture that occurs temporally before or after the current frame from reference picture list 1. When predicted in this manner, the current picture predicted from these two selected reference frames are often referred to as bi-directional-pictures (B-pictures, for short) in that the current picture is predicted from both temporal directions, e.g., both reference units that occur before and after the predictive frame. While referred to as "B-pictures" for this reason, B-pictures may also, in various aspects, be predicted from two reference pictures that occur prior to the B-picture temporally or, alternatively, from two references pictures that occur after the B-picture temporally.

Typically, a B-picture is predicted in this manner on a block-by-block basis and video encoder 20 may select a first reference video block from the first reference picture and a second video block from the second reference picture. To select these blocks, video encoder 20 may identify the first and second blocks as those that best match the current video block or exhibit similar pixel values to that of the current video block to be predicted.

To perform default weighted prediction, video encoder 20 may multiple the first reference video block by a first weight to determine a first weighted video block and the second reference video block by a second weight to determine a second weighted video block. Video encoder 20 may next add the first weighted video block to the second weighted video block to generate a total weighted video block. Video encoder 20 may predict the first version of the current video block in accordance with the default weighted prediction algorithm by dividing the total weighted video block by the number of reference video blocks selected for predicting the first version of the current video block, which is two in this instance, e.g., the first and second reference video blocks. Typically, the first and second weights are equal to one another, e.g., the first weight equals 0.5 or 50% and the second weight equals 0.5 or 50%.

To perform explicit weighted prediction, video encoder 20 may perform a form of prediction where the two or more weights used in predicting the current picture, for example, are encoded within the coded unit. In other words, in explicit weighted prediction, video encoder 20 may explicitly specify the weights used in predicting the current video block at the picture and/or slice level (e.g., in a PPS and/or slice header) in the bitstream. These weights may be defined on a reference picture-by-reference picture basis in the PPS and/or slice header. Explicit weighted prediction may provide video encoder 20 more latitude in selecting the weights and, as a result, may enable video encoder 20 to tailor prediction of the current picture, e.g., a B-picture, to suit a particular context or form of video data. Whether performing default weighted prediction or explicit weighted prediction, video encoder 20 encodes the current video block by subtracting the current video block by the predicted video block to derive residual video data, which is then processed in the manner described below.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

According to aspects of this disclosure, video encoder 20 and/or video decoder 30 may perform advanced residual prediction in accordance with various aspects of the techniques described in this disclosure. To perform advanced residual prediction (ARP), video encoder 20 and/or video decoder 30 may ordinarily have to modify the coding unit (CU) or prediction unit (PU) level as currently proposed in HEVC WD 8 (and possibly HEVC WD 9).

That is, the techniques described in this disclosure may support inter-layer/view-prediction in a scalable or multi-view codec based on HEVC, possibly without introducing new coding tool modules to HEVC. In addition, the techniques may provide so-called "hooks" so that HEVC may be considered "more friendly" to the MV-HEVC extension or scalable extension of HEVC in a way that the functionality of the HEVC specification can be supported possibly without modifying the HEVC specification.

To illustrate, consider one example of Advanced Residual Prediction (ARP) which is described in more detail below with respect to FIG. 6. While the form of ARP for both SVC and MVC may promote coding efficiency (or, in other words, better compress a given picture) in comparison to video coding processes that do not utilize ARP, emerging video coding standards, such as the proposed high efficiency video coding (HEVC) standard, may have to be modified at the block level (or what is referred to as the "coding unit" level in HEVC terms) to support advanced residual prediction for any SVC or MVC extension to the HEVC proposal. Block level changes may be required because the difference signal in the existing ARP is derived on a block-by-block basis. Given that the HEVC proposal, for example, has generally finalized the block level signaling and design, the HEVC proposal may be unable to implement or perform ARP in the corresponding SVC and/or MVC extensions to the HEVC proposal, without modifying the adopted codec from the HEVC proposal.

In accordance with the techniques of this description, a video coding device (which may generally refer to video encoder 20 and/or a video decoder 30) that performs emerging video coding standards may be modified or otherwise adapted to perform various forms of advanced residual prediction in a manner that avoids block level changes to the emerging video coding standards. In other words, video coding device 20 and/or 30 may perform a form of advanced residual prediction using previously defined bi-prediction, which is the above described motion compensation technique generally used to predict a current block from one or more reference blocks of a reference picture in a same or different layer or view than the current picture. The techniques may avoid these changes to the block level by computing a difference picture in its entirety and then storing this difference picture to a reference picture list associated with the current picture, where this difference picture is then used as one of the reference pictures when performing bi-prediction. As a result, the techniques may, by forming a difference picture rather than determine difference blocks, potentially avoiding producing the residual for each block to be predicted one at a time (or, in more colloquial terms, "on-the-fly").

In effect, the video coding device 20 and/or 30 may perform this bi-prediction to predict a current block of a current picture in an enhancement layer such that this bi-prediction is adapted to mimic or, in other words, simulate application of ARP. In this way, the techniques may leverage bi-prediction to perform a picture-level form of advanced residual prediction that may not require significant modification of the block-level aspects of the HEVC or other emerging video coding standards. The techniques may therefore enable video coding devices, such as video encoder 20 and/or video decoder 30, that adhere to emerging video coding standards to still perform advanced residual prediction and thereby provide for additional compression efficiency in comparison to those video coding devices that are unable to perform block-by-block based forms of advanced residual prediction due to adherence to these emerging video coding standards.

In operation, the video decoding device (which will be described for purposes of illustration with respect to video encoder 20 hereinafter) may determine a difference picture for a current picture from a reference picture in a same layer or view as the current picture and a decoded picture (which again may refer to a picture stored to a decoded picture buffer but not included in the reference picture lists) in a different layer or view as the current picture (similar to the discussion of conventional ARP processes below with respect to the example of FIG. 6). Typically, the current picture is in an enhancement layer of SVC video data or the MVC video data. The reference picture in the same layer or view may refer to a temporally different picture in the same layer or view as that (e.g., the enhancement layer) of the current picture. The decoded picture in a different layer or view of the current picture may refer to a picture in a layer below the current layer, such as what is commonly referred to as a base layer. The reference picture and the decoded picture may be in the same access unit, which may refer to a unit that stores all temporally equivalent pictures from different layers and/or views.

While denoted separately herein as layers and views, SVC may be considered a special case of MVC, where the different layers of SVC may be considered as a special case of the views. In other words, while views may capture the same scene from different angles in MVC, the different layers all reflect the same view in SVC, but at varying scales, as discussed in more detail below with respect to the example of FIG. 9. Accordingly, reference to views hereinafter may refer to views in the sense of MVC and/or layers in the sense of SVC. The term "views" as used hereinafter is assumed to refer to both views in MVC and layers in SVC unless explicitly indicated to the contrary. To denote when views are only meant to refer to views of MVC, these views of MVC are referred to as the "views of MVC." Reference to layers may refer only to layers of SVC and the above denotation is not necessary given that layers represent a subset of views. In other words, all layers may be considered as a view, but not all views may be considered as a layer.

Typically, in SVC, reconstructed pictures are stored in the reference picture lists for use in predicting at least a portion (which may refer to a block or, "coding unit" in HEVC terms) of a current picture. In accordance with the techniques described in this disclosure, video encoder 20 may store the difference picture to one or both of two reference picture lists (e.g., the reference picture list 0 and/or the reference picture list 1 noted above) ordinarily used for storing reference pictures. Video encoder 20 may generate one or syntax elements to be stored in a bitstream 16 representative of an encoded version of the scalable or multi-view video data, where the one or more syntax elements identify the difference picture as a picture to be used when decoding the current picture. In this respect, the techniques may slightly modify the purpose of bi-prediction to accommodate or otherwise mimic or simulate application of ARP.

That is, bi-prediction usually involves a weighted prediction of a current block from two reference blocks (which could be in the same reference picture but that are commonly included within two different pictures) identified by motion information (often expressed as a first motion vector and a second motion vector). In performing weighted prediction, video encoder 20 may construct two reference picture lists, often referred to as a reference picture list 0 and a reference picture list 1 (and in syntax tables as RefPicList0 and RefPicList1 or, generally, as RefPicListX where X can be zero or one). Video encoder 20 may then identify reference pictures to be stored to these lists and identify which of the reference pictures stored to each list should be used to predict the current block. Video encoder 20 may identify blocks in the identified reference pictures and then apply weights (which are usually zero, 0.5 and one) to each of the identified blocks prior to adding these blocks together to form a prediction block for the current block. Video encoder 20 may then compute the residual block for the current block by subtracting the prediction block from the current block.

Yet, when performing bi-prediction to simulate application of ARP, video encoder 20 may perform bi-prediction to predict a current block of a current frame in an enhancement layer based on the difference picture stored to a first one of the reference picture lists and a reference picture stored to a second one of the reference picture lists. Video encoder 20 may therefore perform bi-prediction to accommodate application of ARP without requiring changes to the block level aspects of the HEVC proposal.

In other words, video encoder 20 may utilize the difference block to predict the residual block applying a weight to the difference picture (where this weight may be an explicitly signaled weight per explicit weighted prediction or "explicate weighted sample prediction," as this form of weighted prediction is referred in HEVC) and adding the weighted version to the residual block of the current block to effectively perform ARP with respect to the current block so as to derive the residual block. Video encoder 20 may then perform the second prediction of the bi-prediction process, applying a weight (which again may be explicitly signaled for the reference picture in the second one of the reference picture lists) to the reference picture in the second one of the reference picture lists to generate a weighted reference picture before adding the derived residual block to the weighted second reference picture. The result of this bi-prediction may effectively emulate application of ARP to the residual data of the current block and then a uni-directional prediction to recover (at least partially) the current block. Video encoder 20 may signal in the bitstream the index of the difference picture in the first reference picture list, e.g., reference picture list 0, and the index of the reference picture in the second reference picture list, e.g., reference picture list 1, to be used when performing the bi-prediction to emulate application of ARP followed by a uni-directional prediction.

Video decoder 30 may then determine, from the bitstream representative of the encoded version of the scalable or multi-view video data, the one or more syntax elements that identify the difference picture stored to the first one of the reference picture lists as one of the picture and an index of the reference picture stored to the second one of the reference picture lists. Video decoder 30 may then form both of the reference picture lists for the current picture, storing the identified difference picture and the identified reference picture to the reference picture lists and perform bi-prediction in a manner that mimics, at least in part, application of ARP. Video decoder 30 may next perform the bi-prediction based on the identified difference picture and the identified reference picture to generate the current picture in the manner that mimics or, in other words, simulates application of ARP to derive the residual data for the current block followed by application of a uni-prediction to recover, at least partially, the current block.

Moreover, bi-prediction usually only works with respect to pictures having a positive-only range of pixel values (such as zero to 255). To accommodate this usual operation of bi-prediction, the techniques may enable video encoder 20 to specify difference pictures (of which one common feature to difference pictures is that these pictures may have pixel values that are negative given that these pictures express differences) in a manner understood by video decoder 30 when performing the bi-prediction. That is, video decoder 30 may perform checks to ensure that pictures were not corrupted due to transmission, storage or other conditions. Video decoder 30 may check pixel values of pictures stored to the reference picture list to ensure that these are within a given positive range, such as zero to 255. In some instances, video decoder 30 may discard those pictures having negative values.

To accommodate difference pictures, video decoder 30 may shift the values of each pixel of the difference picture to be in the accepted positive range of values (e.g., shifting difference pixels from a range of −127 through 128 to a positive range of zero to 255). Video decoder 30 may shift these difference pixels from the negative range to the positive range before storing these difference pictures to the reference picture list, and then shift the values back to the original range from the positive range prior to performing bi-prediction.

Additionally, to the extent that temporal motion vector prediction processes rely on motion information (such as motion vectors and/or, in the case of MVC, disparity vectors), the techniques may enable video encoder 20 to attribute motion information of the reference picture from which the difference picture was derived to the difference picture. That is, video encoder 20 may determine motion information for the difference picture to be equivalent to motion information of the reference picture from which the difference picture was derived.

In this way, the techniques may avoid block level changes to emerging video coding standards by operating at the picture level to generate the difference signal (while the weighted prediction only operated on a block-by-block basis to generate the difference signal). This difference signal may then be stored to the reference picture list in the manner described above, often by shifting pixel values of the difference picture to a specified positive-only range of values. Moreover, to the extent ARP relies on motion information, the techniques enable video encoder 20 and/or video decoder 30 to perform bi-prediction in which the motion information for the difference picture is equivalent to the motion information associated with the current picture. Each of the above aspects of the techniques may effectively enable the video coding device to mimic application of advanced residual prediction by modifying bi-prediction in the above noted ways, each of which require little to no block-level changes to the emerging video coding standards.

In this respect, the techniques described in this disclosure may enable a video coding device (which may refer to either or both of video encoder 20 and/or video decoder 30) comprising one or more processors to determine a difference picture, for a current picture, based on a first reference picture in a same layer or view as the current picture and a decoded picture in a different layer or view as the current picture. As noted above, the decoded picture may be in a same access unit as the first reference picture. The processors may then perform bi-prediction based on the difference picture to code at least a portion of the current picture.

In some instances, the one or more processors are further configured to, when determining the difference picture, generate the difference picture by setting each pixel value of the difference picture to be the corresponding pixel value in the same pixel position of the first reference picture subtracted by the corresponding pixel value in the same pixel position of the decoded picture.

In some instances, at least one of original values of pixels of the difference picture are less than zero. In these instances, the one or more processors may further be configured to, when determining the difference picture, shift the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture. The one or more processors may then, prior to performing the bi-prediction, shift the shifted values for each of the pixels back to recover the original values for each of the pixels of the difference picture.

In some instances, the one or more processors are further configured to store the difference picture to a first reference picture list. When performing the bi-prediction in these instances, the processors may predict a current block of the current picture from the difference picture stored to the first reference picture list and a second reference picture at a same layer or view as the current picture stored to a second reference picture list.

In some instances, the one or more processors may, when performing the bi-prediction, apply explicit weight prediction for the current picture, apply a first prediction weight to the difference picture, and apply a second prediction weight to the second reference picture.

In some instances, the one or more processors may, prior to performing the bi-prediction, apply the second prediction weight to the second reference picture, the second prediction weight being equal to one. In these and other instances, the first prediction weight for the difference picture is the same as the second prediction weight for the second reference picture. In these and other instances, the first prediction weight for the difference picture is equal to half of the second prediction weight for the second reference picture.

In some instances, the one or more processors are further configured to, when determining the difference picture, multiply the first reference picture by a weight equal to two to generate a weighted first reference picture, and determine the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

In some instances, the one or more processors are further configured to store two or more copies of the difference picture or a derivation thereof to a first reference picture list, and, when performing bi-prediction, perform bi-prediction for a current block of the current picture based on one of the two or more multiple copies of the difference picture stored to the first reference picture list and a reference picture at the same layer or view as the current picture stored to a second reference picture list.

In some instances, the one or more processors are further configured to determine motion information for the difference picture to be equivalent to motion information of the first reference picture of the current picture when temporal motion vector prediction is from the difference picture.

More specifically, the techniques may provide the following functionality in video encoder 20 and/or video decoder 30. First, for a current picture in the current (enhancement) layer, video encoder 20 calculates a difference picture based on a reference picture of the current layer and co-located picture (the picture in the same access unit and at the same temporal position) in the base layer. Video encoder 20 may add the difference picture to a reference picture list of the current picture. Video encoder 20 may, in some examples, also add the difference picture into a reference picture list multiple times, and each time as an entry with or without different processing/filtering.

In some examples, video encoder 20 may specify the difference picture using the same precision as that used to specify pictures in base layer. For example, when the base layer is coded with 8-bit precision, the difference picture is specified using 8-bit precision. As another example, when the base layer is coded with 10-bit precision, the difference picture is specified using 10-bit precision. In some instances, the difference picture and the associated picture should not be used together to bi-directionally inter-predict one block (prediction unit). In some instances, when used to predict bi-directional inter predicted block, the other reference picture for this block must be the base layer/reference view co-located picture, also known as an inter-layer/view reference picture.

In some examples, video encoder 20 may modify the base HEVC specification such that, during the bi-prediction process, video encoder 20 may subtract (1<<(bitDepth−1)) from the pixel value of the predictor, where bitDepth may be equal to the bit depth of a color component (typically 8).

In some examples, one or more difference pictures corresponding to different previously coded picture locations may be added into an inter-layer reference picture list.

In some examples, video encoder 20 marks a difference picture as "unused for reference" once its associated picture in the current layer is marked as "unused for reference." Video encoder 20 may then remove a difference picture from the decoded picture buffer (DPB) once this difference picture is marked as "unused for reference". Alternatively, a difference picture may be marked as "unused for reference" in a more optimized way.

In some examples, video encoder 20 may weight the difference pictures based on the signaling as in the prediction weights table defined in HEVC. Alternatively, in an enhancement layer codec, video encoder 20 may explicitly signal the weights for each difference picture, in the sequence parameter set, picture parameter set or slice header. Alternatively, video encoder 20 may derive the prediction weights to be either 0.5 or 1 based on various conditions, syntax elements or other aspects of the video data.

In some examples, video encoder 20 may only add the difference picture closest to the current picture in display order into a reference picture list. This difference picture may be added to the reference picture list twice, with prediction weights either signaled in the prediction weights table of the slice header or derived to be equal to 0.5 and 1 respectively for the two entries corresponding to the same difference picture.

In some examples, video encoder 20 may set the motion field (as specified by motion information, such as motion vectors and/or disparity vectors) of a difference picture to be the same as the motion field of the associated picture in the current layer. When a difference picture is used to predict one block as the reference picture corresponding to RefPicListX (with X being equal to 0 or 1), video encoder 20 may bi-predict the current block and the other reference picture is an inter-layer reference picture.

In some examples, video encoder 20 may generate a different picture by a reference picture of the current layer (picEnhT) and its co-located picture (picBaseT) using one or more of the following processes, where a subtraction operation indicates subtraction for each co-located pixel pair of the two input pictures:
1) (picEnhT−picBaseT)*0.5;
2) picEnhT−picBaseT; and
3) picEnhT*2-picBaseT.

In this way, the techniques may adapt or otherwise modify bi-prediction to perform a picture-level form of advanced residual prediction that may not require significant modification of the block-level aspects of the HEVC or other emerging video coding standard proposals. The techniques may therefore enable video coding devices that adhere to emerging video coding standards to perform advanced residual prediction and thereby provide for additional compression efficiency in comparison to those video coding devices that are unable to perform advanced residual prediction.

Figure 2:
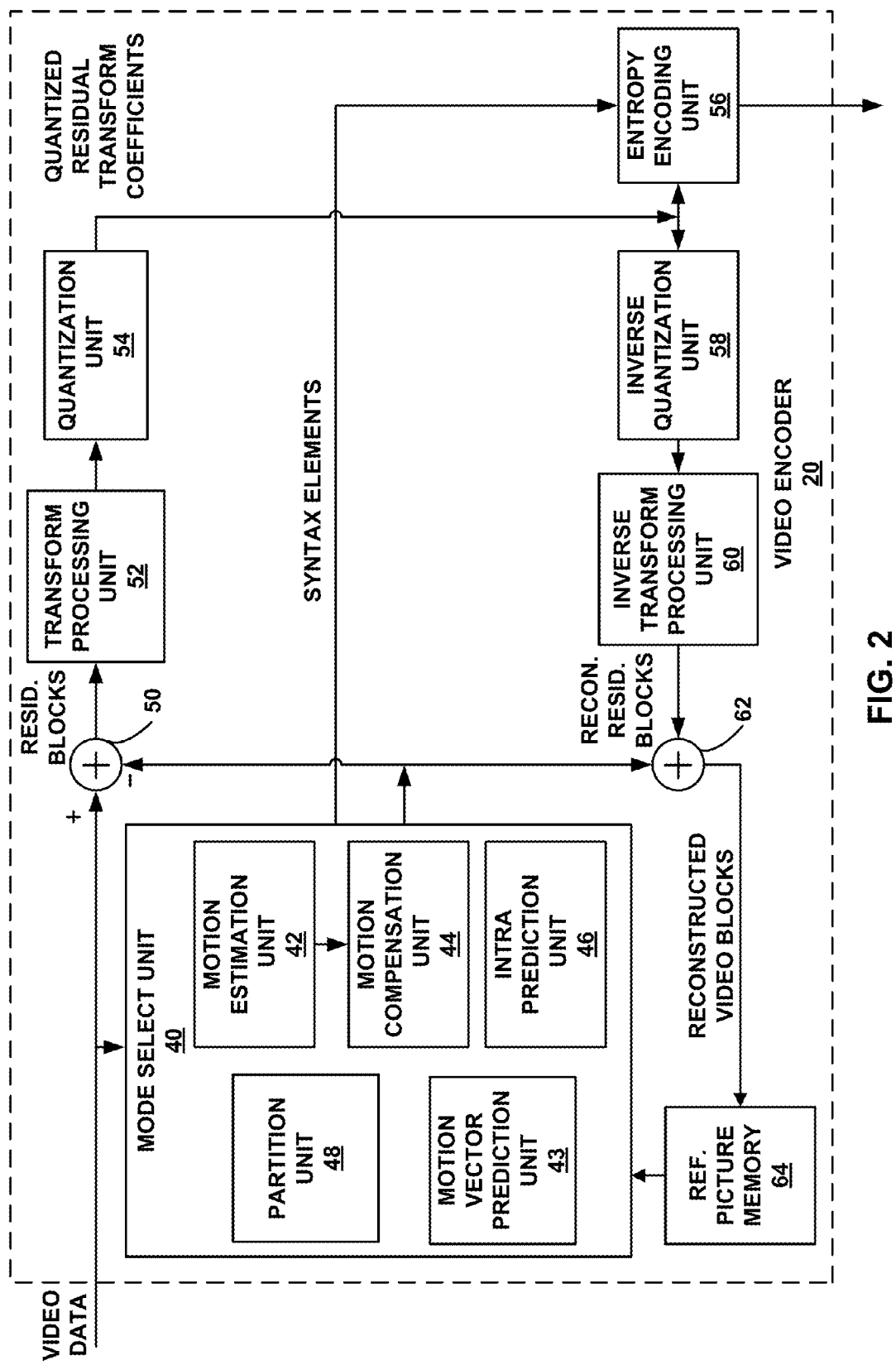
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform any aspect or combination of aspects of the techniques described above. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion estimation unit 42, motion compensation unit 44, intra prediction unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

During the encoding process, video encoder 20 receives a picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42, motion vector prediction unit 43, and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. Accordingly, in general, data for a motion vector may include a reference picture list, an index into the reference picture list (ref_idx), a horizontal component, and a vertical component. The reference picture may be selected from a first reference picture list (List 0), a second reference picture list (List 1), or a combined reference picture list (List c), each of which identify one or more reference pictures stored in reference picture memory 64.

Motion estimation unit 42 may generate and send a motion vector that identifies the predictive block of the reference picture to entropy encoding unit 56 and motion compensation unit 44. That is, motion estimation unit 42 may generate and send motion vector data that identifies the reference picture list containing the predictive block, an index into the reference picture list identifying the picture of the predictive block, and a horizontal and vertical component to locate the predictive block within the identified picture.

Motion compensation, performed by motion compensation unit 44, may involve fetching or generating the predictive block based on the motion vector determined by motion estimation unit 42 and/or the information from motion vector prediction unit 43. Again, motion estimation unit 42, motion vector prediction unit 43, and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent picture.

In accordance with the techniques described in this disclosure, motion compensation unit 44 may determine a difference picture, for a current picture, based on a reference picture in a same layer or view as the current picture and a decoded picture in a different layer or view as the current picture. Using this difference picture, motion compensation unit 44 may then perform bi-prediction to generate and encoded version of at least a portion of the current picture.

In some instances, at least one pixel value of the difference picture is less than zero. That is, the difference picture may express a difference between two pictures, which are often weighted versions of the pictures. Given that pixel values of pictures are commonly restricted to a positive-only range of values (including zero), motion compensation unit 44 may shift at least one pixel value of the difference picture to generate a shifted pixel value having a value greater than or equal to zero. Motion compensation unit 44 may perform this shift prior to storing the difference picture in a reference picture list. Prior to performing the bi-prediction, motion compensation unit 44 may shift the shifted pixel value back to recover the original pixel value of the difference picture. By shifting the pixels in this manner, the techniques may not change the underlying HEVC proposal, while ensuring advanced residual prediction is cable of being performed in the SVC and/or MVC extensions of the HEVC proposal.

In some instances, possibly after shifting pixel values, motion compensation unit 44 may store the difference picture to a reference picture list and generate one or syntax elements that identify the difference picture as a picture to be used when decoding the current picture. The one or syntax elements may be stored in bitstream 16 representative of an encoded version of the scalable or multi-view video data. Typically, motion compensation unit 44 performs multiple coding passes to encode a single block, each pass involving a different configuration of the coding process. Motion compensation unit 44 may perform these multiple coding passes so as to perform a form of rate-distortion optimization, selecting what may be considered the optimal (in terms of signal-to-noise ratio, bitrate and/or other criteria) coding pass. Motion compensation unit 44 may then select the syntax elements used in the optimal coding pass and provide these syntax elements to entropy encoding unit 56, which stores the syntax elements (possibly after entropy encoding the syntax elements) in bitstream 16.

In some instances, motion compensation unit 44 may store two or more copies of the difference picture or a derivation thereof to one or more reference picture lists. When performing the bi-prediction, motion compensation unit 44 may predict the current picture based on the two or more copies of the difference picture or the derivations thereof to generate at least the portion of the current picture.

In some examples, motion compensation unit 44 may determine motion information for the difference picture to be equivalent to motion information of the current picture. Motion compensation unit 44 may perform the bi-prediction based on the motion information determined for the difference picture and based on the difference picture to generate the current picture in the manner that simulates, at least in part, performing the advanced residual prediction.

In some examples, motion compensation unit 44 may performing bi-prediction based on the difference picture to generate at least the portion of the current picture in the manner that simulates performing weighted prediction. Again, application of weighted prediction is described in more detail below with respect to FIG. 6.

When determining the difference picture, motion compensation unit 44 may, in some examples, determine the difference picture, for a current picture, based on weighted version of the reference picture in the same layer or view as the current picture and a weighted version of the reference picture in the different layer or view as the current picture. Various weights may be used, but typically weights include zero, 0.5 and one. These weights, as noted above, may be explicitly signaled in the bitstream (meaning, as one example, that the values are signaled), implied (meaning, for example, that these weights are implied from other syntax elements, constraints or values) or identified (meaning, as an example, that these weights are identified by an index for example into a table or other data structure or possibly by a memory address, etc.).

In operation, video encoder 20 may determine a difference picture, for a current picture, based on a first reference picture in a same layer or view as the current picture and a decoded picture in a different layer or view as the current picture, wherein the decoded picture is in a same access unit as the first reference picture, and perform bi-prediction based on the difference picture to decode at least a portion of the current picture.

In some instances, at least one of original values of pixels of the difference picture are less than zero, and video encoder 20 may determine the difference picture comprises shifting the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture. Video encoder 20 may, prior to performing the bi-prediction, shift the shifted values for each of the pixels back to recover the original values for each of the pixels of the difference picture.

In some instances, video encoder 20 may store the difference picture to a first reference picture list, and when performing the bi-prediction, predict a current block of the current picture from the difference picture stored to the first reference picture list and a second reference picture at a same layer or view as the current picture stored to a second reference picture list.

In some instances, video encoder 20 may, when determining the difference picture. apply a weight to a difference picture to generate a weighted difference picture. When performing bi-prediction, video encoder 20 may perform the bi-prediction based on the weighted difference picture to decode at least the portion of the current picture in a manner that simulates, at least in part, performing advanced residual prediction. In some instances, the weight is the same as the second reference picture. In some instances, the weight is equal to half the second reference picture.

In some instances, video encoder 20 may apply a weight to the second reference picture to generate a weighted second reference picture, wherein the weight equals one. In these instances, when performing the bi-prediction, video encoder 20 may predict a current block of the current picture from the weighted difference picture stored to the first reference picture list and the weighted second reference picture at the same layer or view as the current picture stored to a second reference picture list.

In some instances, video encoder 20 may, potentially prior to performing the bi-prediction, apply explicit weighted prediction to the current picture.

In some instances, when determining the difference picture, video encoder 20 may multiply the first reference picture by a weight equal to two to generate a weighted first reference picture, and determine the difference picture, for the current picture, based on the weighted first reference picture and the decoded picture.

In some instances, video encoder 20 may store two or more copies of the difference picture or a derivation thereof to a first reference picture list. When performing bi-prediction, video encoder 20 may perform bi-prediction for a current block of the current picture based on one of the two or more multiple copies of the difference picture stored to the first reference picture list and a reference picture at the same layer or view as the current picture stored to a second reference picture list.

In these and other instances, video encoder 20 may determine motion information for the difference picture to be equivalent to motion information of the first reference picture of the current picture when temporal motion vector prediction is from the difference picture.

Figure 3:
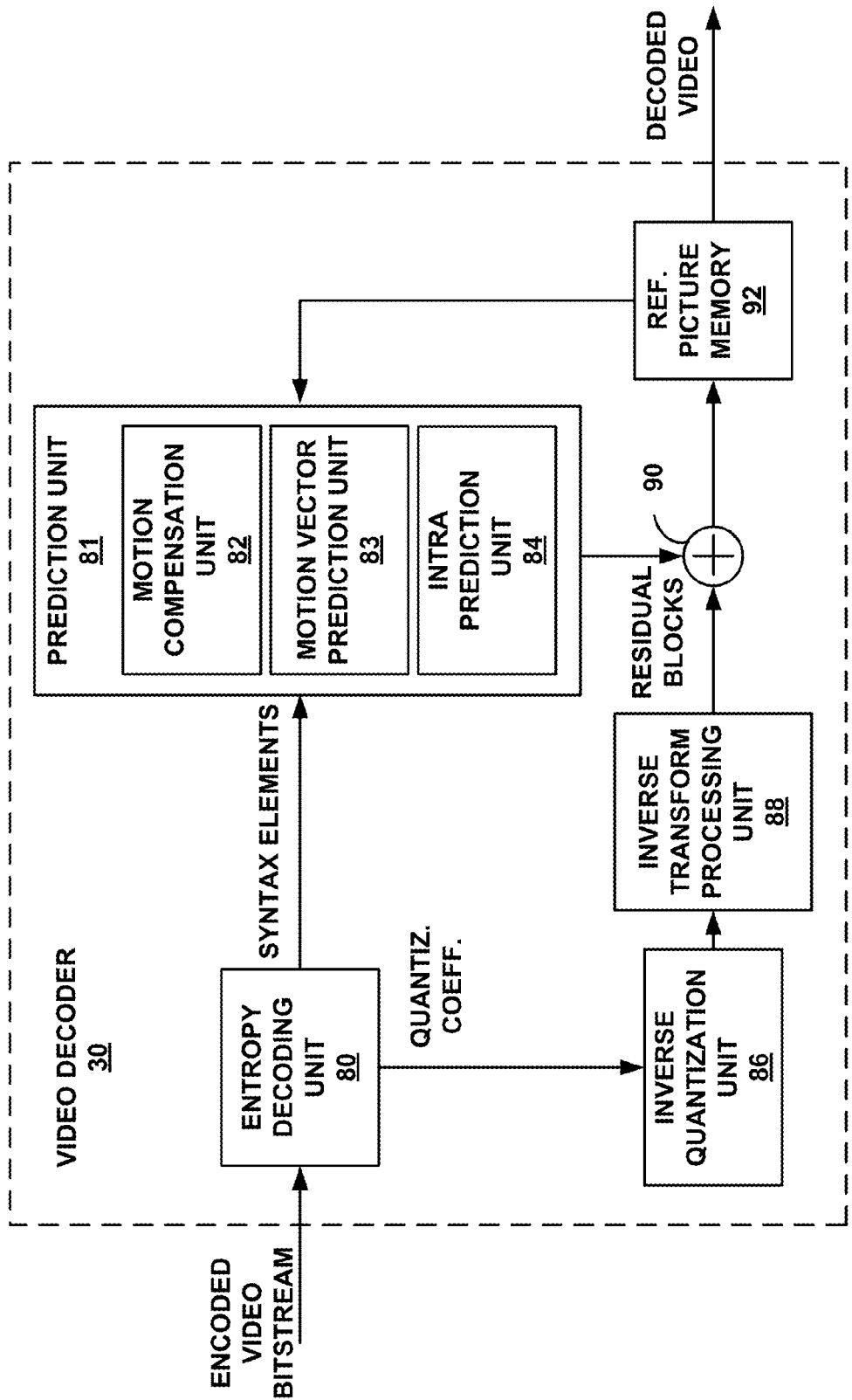
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 may perform any aspect or combination of aspects of the techniques described above. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, by way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

When the video slice is coded as an intra-coded (I) slice, intra prediction unit 84 of prediction unit 81 may generate prediction data for a video block of the current video slice based on a signaled intra prediction mode and data from previously decoded blocks of the current picture. When the picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some examples, motion compensation unit 82 may receive certain motion information from motion vector prediction unit 83.

Motion vector prediction unit 83 may receive prediction data indicating where to retrieve motion information for a current block. After determining motion information for the current block, motion vector prediction unit 83 may generate the predictive block for the current block.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

In accordance with the techniques described in this disclosure, video decoder 30 may perform the reciprocal or, in some aspects, the same process as that described above with respect to video encoder 20 in the example of FIGS. 1 and 2. That is, entropy decoding unit 70 may receive bitstream 16, which may represent an encoded version of scalable and/or multi-view video data. Bitstream 16 may, in addition to residual data, also include syntax elements that effectively configure various modules and/or units of video decoder 30 to decode the encoded version of the scalable and/or multi-view video data. One or more of these syntax elements may identify a difference picture, as described above, that is to be stored to a reference picture list in a pre-configured, signaled or implicitly known way. Entropy decoding unit 80 may pass the residual data for the enhancement layer and these one or more syntax elements that identify the difference picture when stored to the reference picture list to prediction unit 81.

Prediction unit 81 may then perform bi-prediction to decode a current picture of an enhancement layer based on the difference picture in a manner that simulates application of ARP similar to that described above, and which is described below with respect to the example of FIG. 6 in greater detail. In particular, motion compensation unit 82 may perform this bi-prediction.

In other words, entropy decoding unit 80 may determine, from bitstream 16 representative of an encoded version of the scalable or multi-view video data, one or more syntax elements that identify the difference picture stored to a reference picture list as a picture to be used when decoding the current picture. Motion compensation unit 82 may then store the difference picture to a reference picture list. When performing the bi-prediction, motion compensation unit 82 may identify the difference picture as the picture to be used when performing the bi-prediction with respect to the current picture based on the one or more syntax elements and the reference picture list, and perform the bi-prediction based on the identified difference picture in the reference picture list to generate the current picture in the manner that simulates, at least in part, performing the advanced residual prediction.

In operation, motion compensation unit 82 may determine a difference picture, for a current picture, based on a first reference picture in a same layer or view as the current picture and a decoded picture in a different layer or view as the current picture, wherein the decoded picture is in a same access unit as the first reference picture, and perform bi-prediction based on the difference picture to encode at least a portion of the current picture.

In some examples, at least one of original values of pixels of the difference picture are less than zero. Motion compensation unit 82 may, when determining the difference picture, shift the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture. Motion compensation unit 82 may the method further comprises, prior to performing the bi-prediction, shifting the shifted values for each of the pixels back to recover the original values for each of the pixels of the difference picture.

In some examples, motion compensation unit 82 may store the difference picture to a first reference picture list. Motion compensation unit 82 may, when performing the bi-prediction, predict a current block of the current picture from the difference picture stored to the first reference picture list and a second reference picture at a same layer or view as the current picture stored to a second reference picture list.

In some examples, motion compensation unit 82 may, when determining the difference picture, apply a weight to a difference picture to generate a weighted difference picture. When performing bi-prediction, motion compensation unit 82 may perform the bi-prediction based on the weighted difference picture to decode at least the portion of the current picture in a manner that simulates, at least in part, performing advanced residual prediction. In one example, the weight is the same as the second reference picture. In other examples, the weight is equal to half the second reference picture.

In some examples, motion compensation unit 82 may apply a weight to the second reference picture to generate a weighted second reference picture, wherein the weight equals one. When performing the bi-prediction, motion compensation unit 82 predicting a current block of the current picture from the weighted difference picture stored to the first reference picture list and the weighted second reference picture at the same layer or view as the current picture stored to a second reference picture list.

In some examples, motion compensation unit 82 may apply explicit weighted prediction to the current picture.

In some examples, motion compensation unit 82 may, when determining the difference picture, multiply the first reference picture by a weight equal to two to generate a weighted first reference picture, and determine the difference picture, for the current picture, based on the weighted first reference picture and the decoded picture.

In some examples, motion compensation unit 82 may store two or more copies of the difference picture or a derivation thereof to a first reference picture list. When performing bi-prediction in these examples, motion compensation unit 82 may perform bi-prediction for a current block of the current picture based on one of the two or more multiple copies of the difference picture stored to the first reference picture list and a reference picture at the same layer or view as the current picture stored to a second reference picture list.

In some examples, motion compensation unit 82 may determine motion information for the difference picture to be equivalent to motion information of the first reference picture of the current picture when temporal motion vector prediction is from the difference picture.

Figure 4:
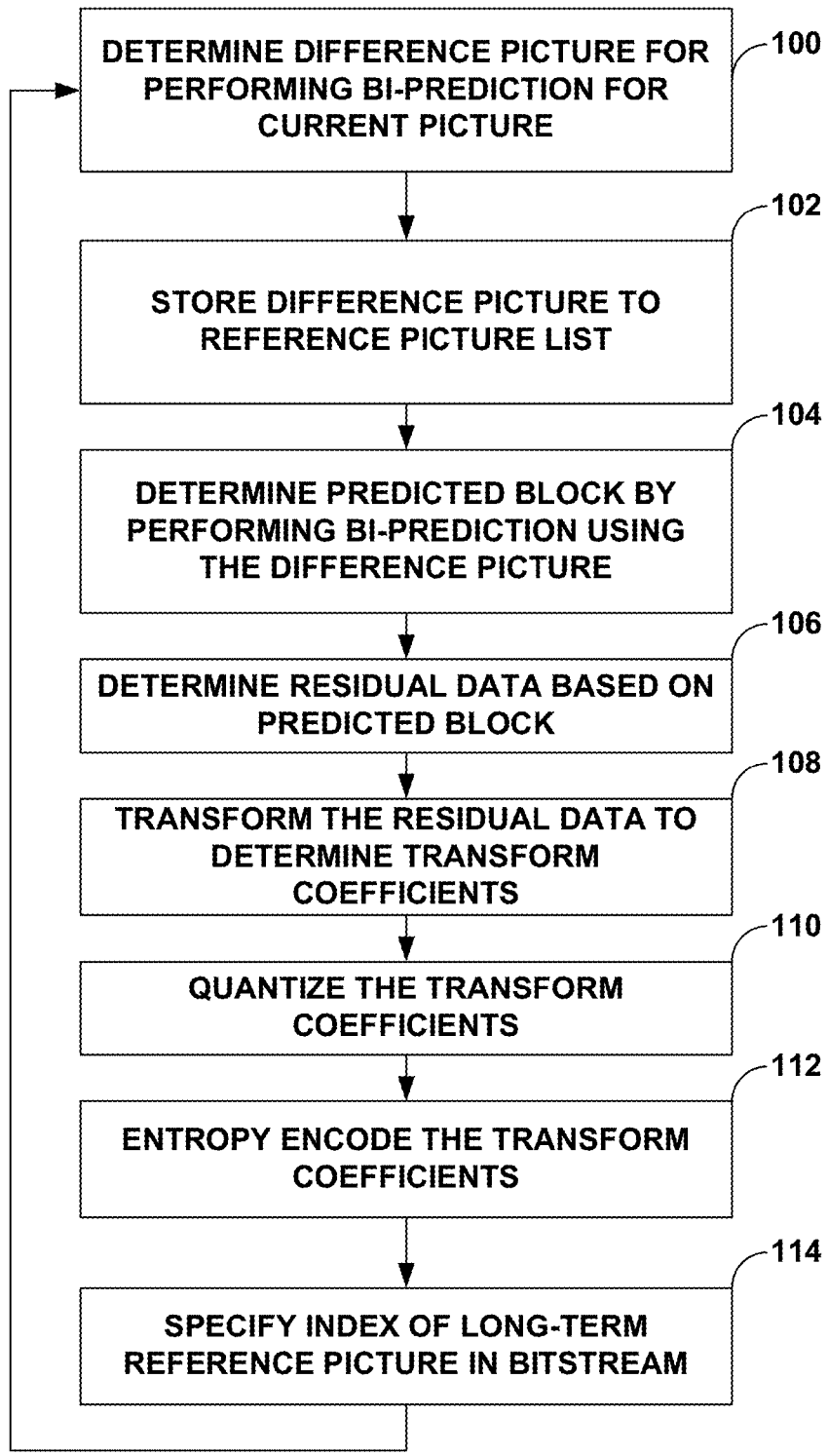
FIG. 4 is a flowchart illustrating example operation of a video encoder in performing various aspects of the techniques described in this disclosure.

FIG. 4 is a flowchart illustrating example operation of a video encoder in performing various aspects of the techniques described in this disclosure. As one example, video encoder 20 shown in the example of FIG. 2 may encode video data in accordance with the techniques of this disclosure. To encode video data in accordance with the techniques, motion compensation unit 44 of video encoder 20 may determine, for a current picture of the video data, a difference picture to be used when performing bi-prediction for a current picture of the video data in the manner described above (100). Motion compensation unit 44 may then store the difference picture to a reference picture list (102).

Video encoder 20 may then use the difference picture identified by the picture order count value to encode the portion of the current picture. In other words, motion compensation unit 44 may also be configured to determine a predicted block by performing bi-prediction using the difference picture in the manner described above (104). Motion compensation unit 44 then determines a residual video block based on the predicted block (106). That is, motion compensation unit 44 then determines a residual video block by subtracting pixel values of the predicted block from the pixel values of the current video block being coded, forming the residual data as pixel difference values. Summer 50 represents the component or components that perform this subtraction operation.

Transform processing unit 52 then transforms the residual block to determine transform coefficients using a transform, such as a discrete cosine transform (DCT) or a conceptually similar transform (108). Transform processing unit 52 may convert the residual video data from a pixel (spatial) domain to a transform domain, such as a frequency domain. Transform processing unit 52 may send the resulting transform coefficients to quantization unit 54. Quantization unit 54 quantizes the transform coefficients to further reduce bit rate (110). The quantization process may reduce the bit depth associated with some or all of the coefficients. Following quantization, entropy encoding unit 56 entropy encodes the quantized transform coefficients (112), inserting the entropy quantized transform coefficients into the bitstream.

Motion compensation unit 44 may also generate one or more syntax elements identifying the difference picture used to predict at least the portion of the current picture in the reference picture list. Motion compensation unit 44 may then pass this index to entropy encoding unit 56. Entropy encoding unit 56 may then specify this index of the difference picture in a bitstream representative of an encoded version of the video data (114).

Figure 5:
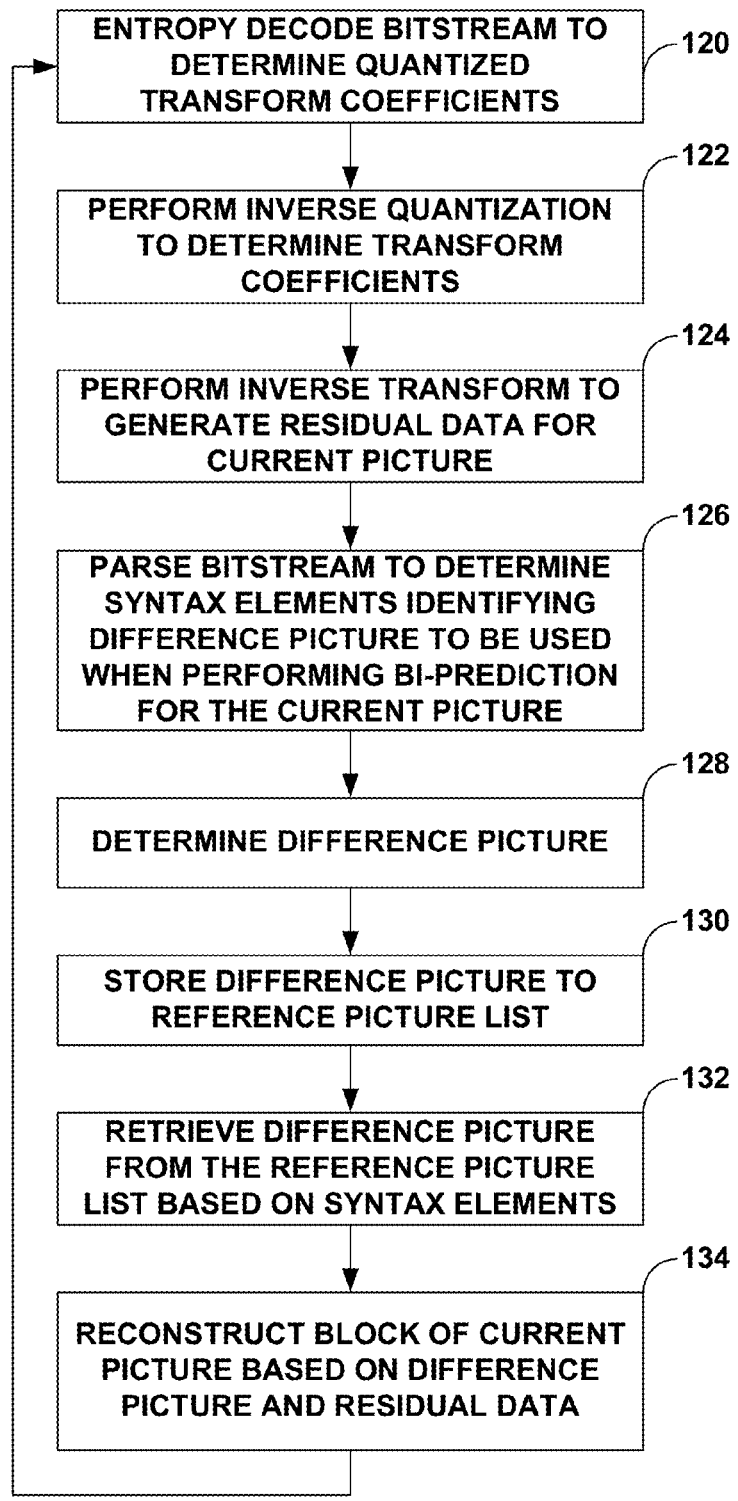
FIG. 5 is a flowchart illustrating example operation of a video decoder in performing various aspects of the techniques described in this disclosure.

FIG. 5 is a flowchart illustrating example operation of a video decoder in performing various aspects of the techniques described in this disclosure. As one example, video decoder 30 implements or is configured to perform the techniques described above. Entropy decoding unit 80 may entropy decode a bitstream representative of encoded video data to determine quantized transform coefficients corresponding to a block (which may represent a portion) of the encoded video data (120). Entropy decoding unit 80 may then pass these quantized transform coefficient to inverse quantization unit 86. Inverse quantization unit 86 may perform inverse quantization with respect to the quantized transform coefficients to determine transform coefficients (122). Inverse transform processing unit 88 may then perform an inverse transform with respect to the transform coefficients to generate residual data for the current picture (124).

Entropy decoding unit 80 may also parse the bitstream to determine, for the block of the current picture, syntax elements identifying a difference picture to be used when performing bi-prediction for the block of the current picture (126). Entropy decoding unit 80 may pass these syntax elements to motion compensation unit 82. Motion compensation unit 82 may determine the difference picture, specifying this difference picture is a reference picture list in the manner described above (128, 130). Motion compensation module 82 may then retrieve the difference picture from the reference picture list based on the syntax elements, which may specify an index into the reference picture list (132).

Motion compensation module 162 may then use the difference picture identified to decode the portion of the current picture in a manner that mimics or, in other words, simulates application of advanced residual prediction (134). Video decoder 30 may store the decoded blocks of video data to decoded picture buffer, which is shown as reference picture memory 92 in the example of FIG. 3, for later use in decoding subsequent pictures. The video decoder may then decode other slices, if any, of the current picture, similarly as described above.

Generally, video encoder 20 and/or video decoder 30 may perform ARB by first generating a difference picture (which may be denoted as "picDiff") and then adding this picDiff to one or both of RefPicListX (where "X" may be either 0 or 1). Video encoder 20 and/or video decoder 30 may then identify a normal reference picture, which may be denoted as "picT," where the T denotes a temporally distant reference picture. Video encoder 20 and/or video decoder 30 may then predict a current block in a current picture bi-directionally from picDiff and picT. Because the weight for picT is normally 1 and the weight for picDiff is some other value, the weights are often different values than the default 0.5 and 0.5 for normal weighted prediction. To achieve adequate advanced residual prediction, weighted prediction may be used, where the weights may not add up to one but may be some different value (usually greater than one but may also be less than one). The practical effect of performing the techniques described in this disclosure may be that the current block is uni-directionally predicted from picT with a weight of one plus some residual from picDiff.

In some examples, video encoder 20 and/or video decoder 30 may implement the following proposed modified version of HEVC to perform the techniques described in this disclosure, where various modification to portions of the HEVC WD8 are denoted using bold and italics.

To perform the techniques, video encoder 20 and/or video decoder 30 may create a difference picture in an HEVC extension, such as the MVC extension to HEVC referred to as "MV-HEVC" or the SVC extension to HEVC, in the manner described below.

With respect to texture components of a picture, after the current layer picture PicLc is decoded and its base layer picture is PicLb, the difference picture may be defined as PicDc=PicLc−PicLb+(1<<(bitDepth−1)), where the subtraction applies to every pixel of each color component. Note it is assumed each pixel is stored as 8-bit.

With respect to the motion field, the motion field of the PicDc is set to the same as PicLc. PicDc may refer to the difference picture of the current picture PicLc. PicLc may refer to the associated picture of the difference picture PicDc.

With respect to management of difference pictures in HEVC extension, the following is provided for reference picture marking. Difference pictures are stored in the decoded picture buffer (DPB). A difference picture reference picture list (DPRPS) is created as follows:

For each picture in RefPicSetLtCurr, RefPicSetLtFoll, RefPicSetStCurrBefore, RefPicSetStCurrAfter or RefPicSetStFoll, its difference picture may be inserted into DPRPS.

All other difference pictures not in DPRPS may be removed from the DPB.

Entries in DPRPS may be further selected to decide which pictures can be used to predict the current picture. For example, only the pictures closest to the current picture are chosen to be the form a currDiffRPS. In one alternative, currDiffRPS is equal to DPRPS.

In addition, more difference pictures may be removed from DPRPS.

A currDiffRPS is used to form reference picture lists similar to inter-layer reference picture list.

Entries in currDiffRPS are marked as short-term reference pictures.

With respect to management of difference pictures in HEVC extension, the following is provided for reference picture list. Pictures in RefPicSetLtCurr, RefPicSetLtFoll, RefPicSetStCurrBefore, RefPicSetStCurrAfter or RefPicSetStFoll, inter-layer reference picture list and currDiffRPS are used for reference picture list construction, similar to HEVC and MV-HEVC.

With respect to reference picture list construction in HEVC extension, in one example, currDiffRPS contains only one entry and this entry is added into the reference picture list twice, with possible reference picture list modification.

With respect to prediction weights derivation in HEVC extension, for the two entries from currDiffRPS, the prediction weights may be set as follows in slice header. Without loss of generality, assume the difference picture is in RefPicList0, with an reference index equal to i (where this difference picture can also be in RefPicList1). When the weighting factor for the difference picture is 1, the weights for a difference picture in RefPicList0 are set as:

luma_log 2_weight_denom: 0
delta_chroma_log 2_weight_denom: 0
(In some instances the above two syntax elements are common for each entry).
luma_weight_l0_flag[i]: 1
delta_luma_weight_l0[i]: 63
chroma_weight_l0_flag[i]: 1
delta_chroma_weight_l0[i][j](j equal to 0 or 1):63
luma_offset_l0[i]: −128
delta_chroma_offset_l0[i][j]: −128

However, the prediction weights of a normal picture can be set as:

luma_weight_l0_flag[i]: 1
delta_luma_weight_l0[i]: 63
chroma_weight_l0_flag[i]: 1
delta_chroma_weight_l0[i][j]: 63
luma_offset_l0[i]: 0
delta_chroma_offset_l0[i][j]: 0

So that if predSamplesL0 is from a difference picture and predSamplesL1 is from a normal picture, the following bi-directional weighted prediction equation as specified in equation (8-230) (which may refer to an equation in HEVC WD8 denoted 8-230):

(predSamplesL0[x][y]*w0+predSamplesL1[x][y]*w1+((o0+o1+1)<<log 2WD))>>(log 2WD+1)) becomes:

(predSamplesL0[x][y]*64+predSamplesL1[x][y]*64+((−128+0+1)<<6))>>7)

When the weighting factor for the difference picture is 0.5, the weights for a difference picture in RefPicList0 are set as:
  luma_log 2 weight_denom: 0
  delta_chroma_log 2_weight_denom: 0
  luma_weight_l0_flag[i]: 1
  delta_luma_weight_l0[i]: 31
  chroma_weight_l0_flag[i]: 1
  delta_chroma_weight_l0 [i][j](j equal to 0 or 1):31
  luma_offset_l0[i]: −64
  delta_chroma_offset_l0[i][j]: −64
However, the prediction weights of a normal picture can be set as:
  luma_weight_l0_flag[i]: 1
  delta_luma_weight_l0[i]: 63
  chroma_weight_l0_flag[i]: 1
  delta_chroma_weight_l0[i][j]: 63
  luma_offset_l0[i]: 0
  delta_chroma_offset_l0[i][j]: 0
So that if predSamplesL0 is from a difference picture and predSamplesL1 is from a normal picture, the following bi-directional weighted prediction equation as specified in equation (8-230):
  (predSamplesL0[x][y]*w0+predSamplesL1[x][y]*w1+((o0+o1+1)<<log 2WD))>>(log 2WD+1)) becomes:
  (predSamplesL0[x][y]*32+predSamplesL1[x][y]*64+((−64+0+1)<<6))>>7)

In some instances, in the HEVC extension, there can be one flag or indicator in sequence parameter set, picture parameter set or slice header, indicating whether difference pictures are used, and how many of them are used, such that prediction weights do not need to be signaled and can be derived in a way similar to as described above.

With respect to a bi-prediction hook in HEVC base specification, two flags sFlagL0 and sFlagL1 are introduced to indicate whether the predictor should be further extracted by a value of (1<<(bitDepth−1)) for the predictors corresponding to RefPicList0 and RefPicList1 directions respectively. In some instances, implicit weighted prediction may not need to be used and Default weighted sample prediction process can be always used to support difference domain prediction if the weight is 1.

In one example instance, video encoder 20 may always set these two flags, sFlagL0 and sFlagL1, to 0 in the HEVC base specification. However, in e.g., a scalable extension of HEVC, video encoder 20 may set these flags in the picture level. Furthermore, if the reference index to the RefPicListX (with X being equal to 0 or 1) corresponds to a difference picture, video encoder 20 may set the sFlagLX to 1. Otherwise, video encoder 20 may set sFlagLX to 0. Alternatively, in some examples, video encoder 20 may only set one flag, either sFlagL0 or sFlagL1, in the base specification, which may result in the subtraction for only one picture.

Modification to the HEVC base specification is shown as follows, where again modification are denoted using bold and italics.

8.5.2.2.3.1 Default Weighted Sample Prediction Process
Inputs to this process are:
  a location (xB, yB) specifying the top-left sample of the current prediction block relative to the top left sample of the current coding block,
  the width and height of this prediction block, nPbW and nPbH,
  two (nPbW)×(nPbH) arrays predSamplesL0 and predSamplesL1,
  prediction list utilization flags, predFlagL0 and predFlagL1,
  a bit depth of samples, bitDepth.
  two variables of value subtraction sFlagL0, sFlagL1.
Outputs of this process are:
  the (nPbW)×(nPbH) array predSamples of prediction sample values. Variables shift1, shift2, offset1 and offset2 are derived as follows.
  The variable shift1 is set equal to 14−bitDepth and the variable shift2 is set equal to 15−bitDepth,
  The variable offset1 is derived as follows.
  If shift1 is greater than 0, offset1 set equal to 1<<(shift1−1).
  Otherwise (shift1 is equal to 0), offset1 is set equal to 0.
  If sFlagL0, shift1 is set equal to (1<<(bitDepth−1))
  The variable offset2 is set equal to 1<<(shift2−1).
  If sFlagL1, the variable offset2 is further modified to be shift2−(1<<(bitDepth−1)).
Depending on the value of predFlagL0 and predFlagL1, the prediction samples predSamples[x][y] with x=0 . . . (nPbW)−1 and y=0 . . . (nPbH)−1 are derived as follows.
  If predFlagL0 is equal to 1 and predFlagL1 is equal to 0, predSamples[x][y]=Clip3(0, (1<<bitDepth)−1, (predSamplesL0[x][y]+offset1)>>shift1) (8-213)
  Otherwise, if predFlagL0 is equal to 0 and predFlagL1 is equal to 1,
  predSamples[x][y]=Clip3(0, (1<<bitDepth)−1, (predSamplesL1[x][y]+offset1)>>shift1) (8-214)
  Otherwise,
  predSamples[x][y]=Clip3(0, (1<<bitDepth)−1,
    (predSamplesL0[x][y]+predSamplesL1[x][y]+offset2)
    >>shift2) (8-215)

8.5.2.2.3.2 Weighted Sample Prediction Process
Inputs to this process are:
  a location (xB, yB) specifying the top-left sample of the current prediction block relative to the top left sample of the current coding block,
  the width and height of this prediction block, nPbW and nPbH,
  two (nPbW)×(nPbH) arrays predSamplesL0 and predSamplesL1,
  prediction list utilization flags, predFlagL0 and predFlagL1,
  reference indices, refIdxL0 and refIdxL1,
  a variable cIdx specifying colour component index,
  a bit depth of samples, bitDepth.
  two variables of value subtraction sFlagL0, sFlagL1.
Outputs of this process are:
  the (nPbW)×(nPbH) array predSamples of prediction sample values.
The variables shift1 is set equal to 14−bitDepth.
The variable subsOffset0 is set to (sFlagL0<<(bitDepth−1)), and subsOffset1 is set to (sFlagL1<<(bitDepth−1)).
The variables log 2WD, o0, o1, and w0, w1 are derived as follows.
  If cIdx is equal to 0 for luma samples,
  log 2WD=luma_log 2_weight_denom+shift1 (8-216)
  w0=LumaWeightL0[refIdxL0](8-217)
  w1=LumaWeightL1[refIdxL1](8-218)
  o0=luma_offset_10[refIdxL0]*(1<<(bitDepth−8)) (8-219)
  o1=luma_offset_11[refIdxL1]*(1<<(bitDepth−8)) (8-220)
  Otherwise (cIdx is not equal to 0 for chroma samples),
  log 2WD=ChromaLog2 WeightDenom+shift1 (8-221)
  w0=ChromaWeightL0[refIdxL0][cIdx−1](8-222)
  w1=ChromaWeightL1[refIdxL1][cIdx−1](8-223)
  o0=ChromaOffsetL0[refIdxL0][cIdx−1]*(1<<(bitDepth−8)) (8-224)
  o1=ChromaOffsetL1[refIdxL1][cIdx−1]*(1<<(bitDepth−8)) (8-225)

The prediction sample predSamples[x][y] with x=0 . . . (nPbW)−1 and y=0 . . . (nPbH)−1 are derived as follows:
  If the predFlagL0 is equal to 1 and predFlagL1 is equal to 0, the prediction samples are derived by:
  if (log 2WD>=1)
    predSamples[x][y]=Clip3(0, (1<<bitDepth)−1, (((predSamplesL0[x][y]−subsOffset0)*w0+2 log 2WD−1)>>log 2WD)+o0) (8-226)
  else
    predSamples[x][y]=Clip3(0, (1<<bitDepth)−1, (predSamplesL0[x][y]−subsOffset0)*w0+o0) (8-227)
  Otherwise, if the predFlagL0 is equal to 0 and predFlagL1 is equal to 1, the final predicted sample values predSamples[x][y] are derived by
  if (log 2WD>=1)
    predSamples[x][y]=Clip3(0, (1<<bitDepth)−1, (((predSamplesL1[x][y]−subsOffset1)*w1+2 log 2WD−1)>>log 2WD)+o1) (8-228) else
    predSamples[x][y]=Clip3(0, (1<<bitDepth)−1, predSamplesL1[x][y]*w1+o1) (8-229)
  Otherwise, the final predicted sample values predSamples[x][y] are derived by
  predSamples[x][y]=Clip3(0, (1<<bitDepth)−1, ((predSamplesL0[x][y]−subsOffset0)*w0+(predSamplesL1[x][y]−subsOffset1)*w1+ ((o0+o1+1)<<log 2WD))>>(log 2WD+1)) (8-230)
  In some other examples, similar to the examples described above, however, sFlagL0+sFlagL1 should be less than two in any case and are equal to one when they only affect the bi-predicted block. More detailed HEVC base specification changes are shown as follows:

8.5.2.2.3.1 Default Weighted Sample Prediction Process
  Inputs to this process are:
    a location (xB, yB) specifying the top-left sample of the current prediction block relative to the top left sample of the current coding block,
    the width and height of this prediction block, nPbW and nPbH,
    two (nPbW)×(nPbH) arrays predSamplesL0 and predSamplesL1,
    prediction list utilization flags, predFlagL0 and predFlagL1,
    a bit depth of samples, bitDepth.
    two variables of value subtraction sFlagL0, sFlagL1.
  Outputs of this process are:
    the (nPbW)×(nPbH) array predSamples of prediction sample values.
  Variables shift1, shift2, offset1 and offset2 are derived as follows.
  The variable shift1 is set equal to 14−bitDepth and the variable shift2 is set equal to 15−bitDepth,
  The variable offset1 is derived as follows.
  If shift1 is greater than 0, offset1 set equal to 1<<(shift1−1).
  Otherwise (shift1 is equal to 0), offset1 is set equal to 0.
  If sFlagL0, shift1 is set equal to (1<<(bitDepth−1))
  The variable offset2 is set equal to 1<<(shift2−1).
  If sFlagL1, the variable offset2 is further modified to be shift2−(1<<(bitDepth−1)).
  Depending on the value of predFlagL0 and predFlagL1, the prediction samples predSamples[x][y] with x=0 . . . (nPbW)−1 and y=0 . . . (nPbH)−1 are derived as follows.
    If predFlagL0 is equal to 1 and predFlagL1 is equal to 0,
      predSamples[x][y]=Clip3(0, (1<<bitDepth)−1, (predSamplesL0[x][y]+offset1)>>shift1) (8-213)
    Otherwise, if predFlagL0 is equal to 0 and predFlagL1 is equal to 1,
      predSamples[x][y]=Clip3(0, (1<<bitDepth)−1, (predSamplesL1[x][y]+offset1)>>shift1) (8-214)
    Otherwise,
      predSamples[x][y]=Clip3(0, (1<<bitDepth)−1, (predSamplesL0[x][y]+predSamplesL1[x][y]+offset2)>>shift2) (8-215)

8.5.2.2.3.2 Weighted Sample Prediction Process
  Inputs to this process are:
    a location (xB, yB) specifying the top-left sample of the current prediction block relative to the top left sample of the current coding block,
    the width and height of this prediction block, nPbW and nPbH,
    two (nPbW)×(nPbH) arrays predSamplesL0 and predSamplesL1,
    prediction list utilization flags, predFlagL0 and predFlagL1,
    reference indices, refIdxL0 and refIdxL1,
    a variable cIdx specifying colour component index,
    a bit depth of samples, bitDepth.
    two variables of value subtraction sFlagL0, sFlagL1.
  Outputs of this process are:
    the (nPbW)×(nPbH) array predSamples of prediction sample values.
  The variables shift1 is set equal to 14−bitDepth.
  The variable subsOffset0 is set to (sFlagL0<<(bitDepth−1)), and subsOffset1 is set to (sFlagL1<<(bitDepth−1)).
  The variables log 2WD, o0, o1, and w0, w1 are derived as follows.
    If cIdx is equal to 0 for luma samples,
      log 2WD=luma_log 2_weight_denom+shift1 (8-216)
      w0=LumaWeightL0[refIdxL0] (8-217)
      w1=LumaWeightL1[refIdxL1] (8-218)
      o0=luma_offset_l0[refIdxL0]*(1<<(bitDepth−8)) (8-219)
      o1=luma_offset_l1[refIdxL1]*(1<<(bitDepth−8)) (8-220)
    Otherwise (cIdx is not equal to 0 for chroma samples),
      log 2WD=ChromaLog2 WeightDenom+shift1 (8-221)
      w0=ChromaWeightL0[refIdxL0][cIdx−1] (8-222)
      w1=ChromaWeightL1[refIdxL1][cIdx−1] (8-223)
      o0=ChromaOffsetL0[refIdxL0][cIdx−1]*(1<<(bitDepth−8)) (8-224)
      o1=ChromaOffsetL1[refIdxL1][cIdx−1]*(1<<(bitDepth−8)) (8-225)
  The prediction sample predSamples[x][y] with x=0 . . . (nPbW)−1 and y=0 . . . (nPbH)−1 are derived as follows:
    If the predFlagL0 is equal to 1 and predFlagL1 is equal to 0, the prediction samples are derived by:
      if (log 2WD>=1)
        predSamples[x][y]=Clip3(0, (1<<bitDepth)−1, ((predSamplesL0[x][y]*w0+2$^{log\ 2WD-1}$)>>log 2WD)+o0)
      else
      predSamples[x][y]=Clip3(0, (1<<bitDepth)−1, predSamplesL0[x][y]*w0+o0) (8-227)
    Otherwise, if the predFlagL0 is equal to 0 and predFlagL1 is equal to 1, the final predicted sample values predSamples [x][y] are derived by
      if (log 2WD>=1)
      predSamples[x][y]=Clip3(0, (1<<bitDepth)−1, ((predSamplesL1[x][y]*w1+2$^{log\ 2WD-1}$)>>log 2WD)+o1) (8-228)
      else
      predSamples[x][y]=Clip3(0, (1<<bitDepth)−1, predSamplesL1[x][y]*w1+o1) (8-229)

Otherwise, the final predicted sample values predSamples[x][y] are derived by predSamples[x][y]=Clip3(0, (1<<bitDepth)−1,
((predSamplesL0[x][y]−subsOffset0)*w0+(predSamplesL1[x][y]−subsOffset1)*w1+
((o0+o1+1)<<log 2WD))>>(log 2WD+1)) (8-230)

In some examples, to further support 0.5 weighting with the default weighted sample prediction process, the default weighted sample prediction process may be further modified as follows. For simplicity in this example, we assume the difference picture is always in RefPicList0.
Inputs to this process are:
 a location (xB, yB) specifying the top-left sample of the current prediction block relative to the top left sample of the current coding block,
 the width and height of this prediction block, nPbW and nPbH,
 two (nPbW)×(nPbH) arrays predSamplesL0 and predSamplesL1,
 prediction list utilization flags, predFlagL0 and predFlagL1,
 a bit depth of samples, bitDepth.
 two variables of value subtraction sFlagL0.
 a weighting flag wf.
Outputs of this process are:
 the (nPbW)×(nPbH) array predSamples of prediction sample values.
Variable addShift is set to 0.
Variables shift1, shift2, offset1 and offset2 are derived as follows.
 The variable shift1 is set equal to 14−bitDepth and the variable shift2 is set equal to 15−bitDepth,
 The variable offset1 is derived as follows.
 If shift1 is greater than 0, offset1 set equal to 1<<(shift1−1).
  Otherwise (shift1 is equal to 0), offset1 is set equal to 0.
  If sFlagL0, shift1 is set equal to (1<<(bitDepth−1)) and addShift is set to wf
 The variable offset2 is set equal to 1<<(shift2−1).
Depending on the value of predFlagL0 and predFlagL1, the prediction samples predSamples[x][y] with x=0 . . . (nPbW)−1 and y=0 . . . (nPbH)−1 are derived as follows.
 If predFlagL0 is equal to 1 and predFlagL1 is equal to 0, predSamples[x][y]=Clip3(0, (1<<bitDepth)−1, (predSamplesL0[x][y]+offset1)>>shift1) (8-213)
 Otherwise, if predFlagL0 is equal to 0 and predFlagL1 is equal to 1, predSamples[x][y]=Clip3(0, (1<<bitDepth)−1, (predSamplesL1[x][y]+offset1)>>shift1) (8-214)
 Otherwise,
predSamples[x][y]=Clip3(0, (1<<bitDepth)−1,
 ((predSamplesL0[x][y]>>addShift)+predSamplesL1[x][y]+offset2)>>shift2) (8-215)
Similar to sFlagL0, the variable wf is always set to 0 in the base specification. In an HEVC scalable codec, when sFlagL0 is derived to 1 due to the prediction from a difference picture, the variable wf may be set to either 0 or 1.

Figure 6:
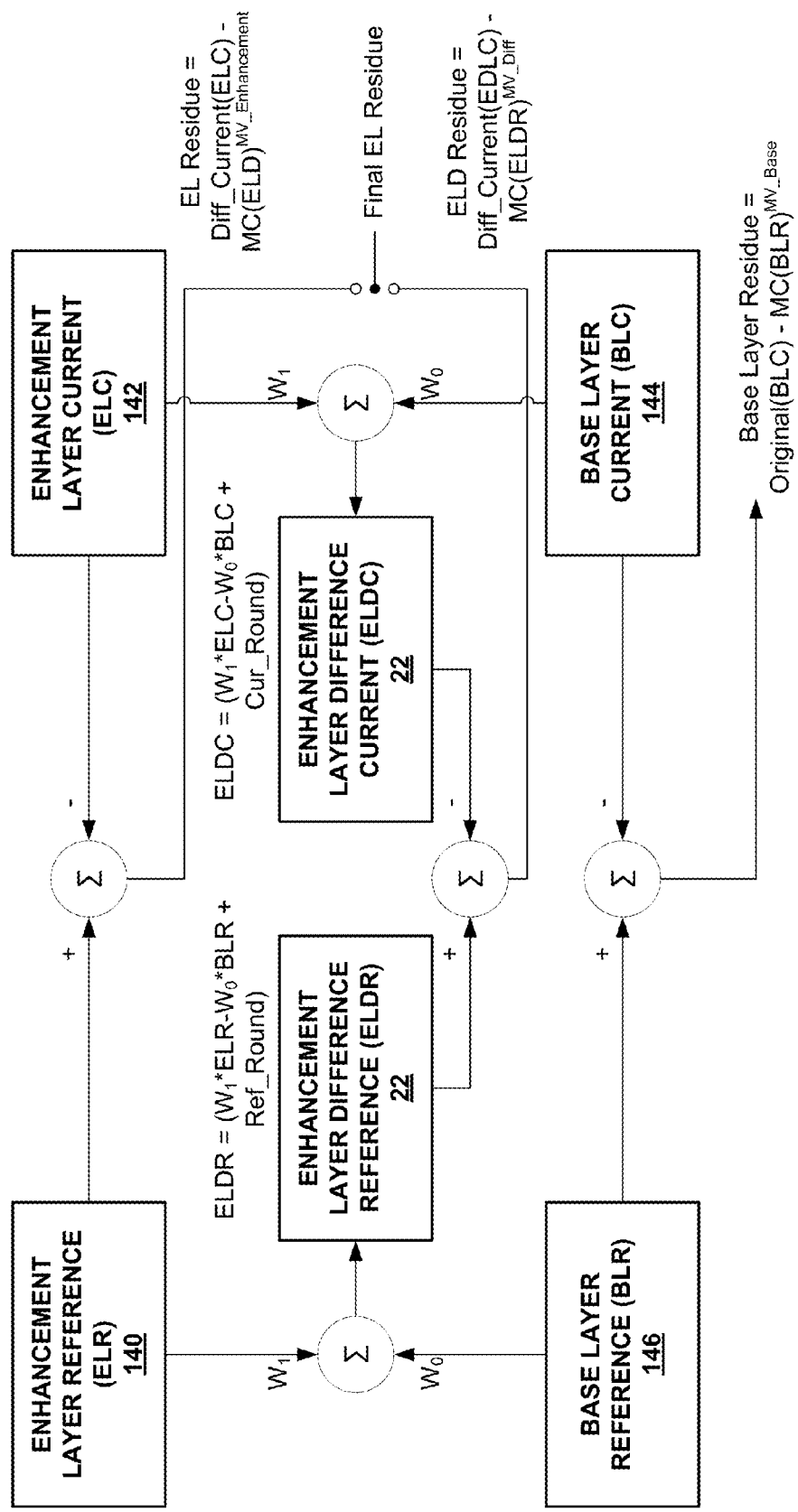
FIG. 6 is a diagram illustrating example weighted difference domain uni-directional prediction for SVC.

FIG. 6 is a diagram illustrating example one form of advanced residual prediction referred to as weighted difference domain uni-directional prediction for SVC. In the example of FIG. 6, the weighted difference uni-prediction involves the computation of a difference signal, where this difference signal is computed as a function of the current layer (which may be another way to refer to an enhancement layer (EL)) reconstructed signal and the corresponding base layer reconstructed signal. In particular, the difference signal is computed by subtracting the current layer reconstructed signal from the corresponding base layer reconstructed signal. The difference signal is then used to predict the residue of the current block, where this difference signal may be weighted before the difference signal is used as a prediction block of the residue (which may also be referred to as the residual block).

The weighted difference signal may be defined as follows:

Weighted Difference Signal=We*EL Reference−Wb*BL col reference+offset, where We and Wb are weights applied for the EL reference and BL reference pixels respectively. The value of the offset may typically be in a range of −128 to 127, inclusive. The EL Reference refers to the enhancement layer (EL) reference (denoted as ELR 140 in the example of FIG. 6) that represents a temporal reference for the current enhancement layer (denoted as ELC 142 in the example of FIG. 6).

Different weighting for the difference domain reconstruction may be obtained by modulating We and Wb. For example, when We=Wb=1 for the reference picture and We=1 and Wb=0 for the current picture, EL Final Prediction=BL collocated block 144+MC(EL Reconstructed block 140−BL Reconstructed block 146), where the MC( ) function refers to the motion compensation function, meaning that a disparity vector may be defined to identify the BL reconstructed block 146 relative to the EL reconstructed block 140. As another example, when We=Wb=0.5 of the reference picture and We=1 and Wb=0 of the current picture, EL Final Prediction=BL collocated block 144+0.5*MC(EL Reconstructed block 140−BL Reconstructed block 146). As yet another example, when We=1 and Wb=0 for the reference picture and We=1 and Wb=0 for the current picture, EL Final Prediction=MC(EL Reconstructed block 140).

While the weighted prediction for both SVC and MVC may promote coding efficiency (or, in other words, better compress a given picture) in comparison to video coding processes that do not utilize weighted prediction, emerging video coding standards, such as the proposed high efficiency video coding (HEVC) standard, may have to be modified at the block level (or what is referred to as the "coding unit" level in HEVC terms) to support advanced residual prediction for any SVC or MVC extension to the HEVC proposal. Block level changes may be required because the difference signal in some forms of advanced residual prediction is derived on a block-by-block basis. Given that the HEVC proposal, for example, has generally finalized the block level signaling and design, the HEVC proposal may be unable to implement or perform the advanced residual prediction in the corresponding SVC and/or MVC extensions to the HEVC proposal, without modifying the adopted codec from the HEVC proposal.

In other words, difference domain prediction is defined as a technique where current layer reconstructed signal is subtracted from the corresponding Base Layer reconstructed signal and the resultant forms a difference signal. The difference signal may be further used to predict the residue or residual of the current block. Further as shown in the FIG. 6, the difference signal can be weighted before it is used as prediction of the residue.

Referring to FIG. 6, the following may be observed:

Weighted Difference Signal=We*EL Reference−Wb*BL col Reference+offset. We and Wb may denote weights applied for EL reference and BL reference pixels respectively. In some instances, the value of the offset could be in the range −128 to 127, inclusive. In some instances, different weighting for the difference domain reconstruction can be obtained by modulating We and Wb.

For example:

1) when We=Wb=1 for the reference Picture and We=1 and Wb=0 for the current Picture, then EL Final Prediction=BL collocated block+MC(EL Recon−BL Recon)

2) When We=Wb=0.5 for the reference Picture and We=1 and Wb=0 for the current Picture, then EL Final Prediction=BL collocated block+0.5*MC(EL Recon−BL Recon)

3) When We=1 and Wb=0 for the reference Picture and We=1 and Wb=0 for the current Picture, then EL Final Prediction=MC(EL Recon)

In some instances, this is same as HEVC conventional uni-directional prediction. In some instances, more finer adaptive weights can be chosen based on R-D optimization criteria.

Figure 7:
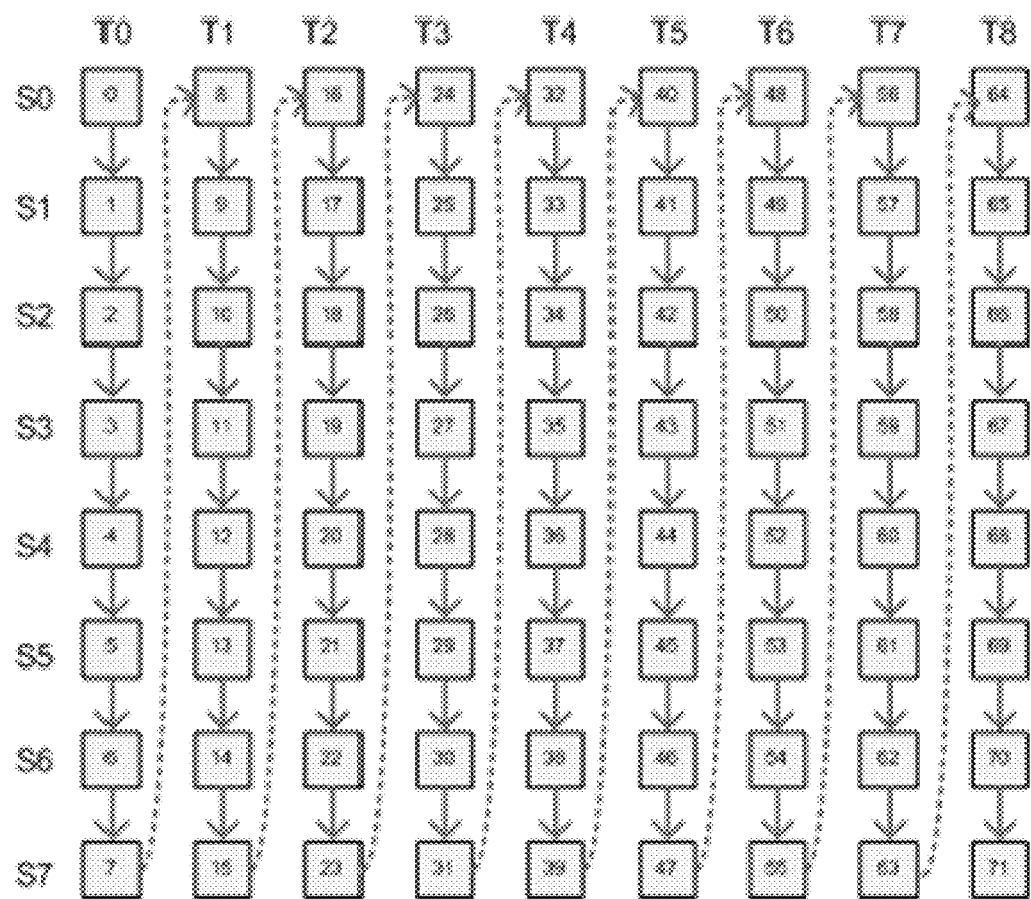
FIG. 7 is a conceptual diagram illustrating coding a Multiview Video Coding (MVC) sequence.

FIG. 7 is a conceptual diagram illustrating coding a Multiview Video Coding (MVC) sequence. As noted above, MVC is an extension of H.264/AVC. A typical MVC decoding order (which may refer to a so-called "bitstream order") is shown in FIG. 7. The decoding order arrangement is referred as "time-first coding." That is, each access unit is defined to contain the coded pictures of all the views for one output time instance. In some instances, the decoding order of access units may not be identical to the output or display order.

Figure 8:
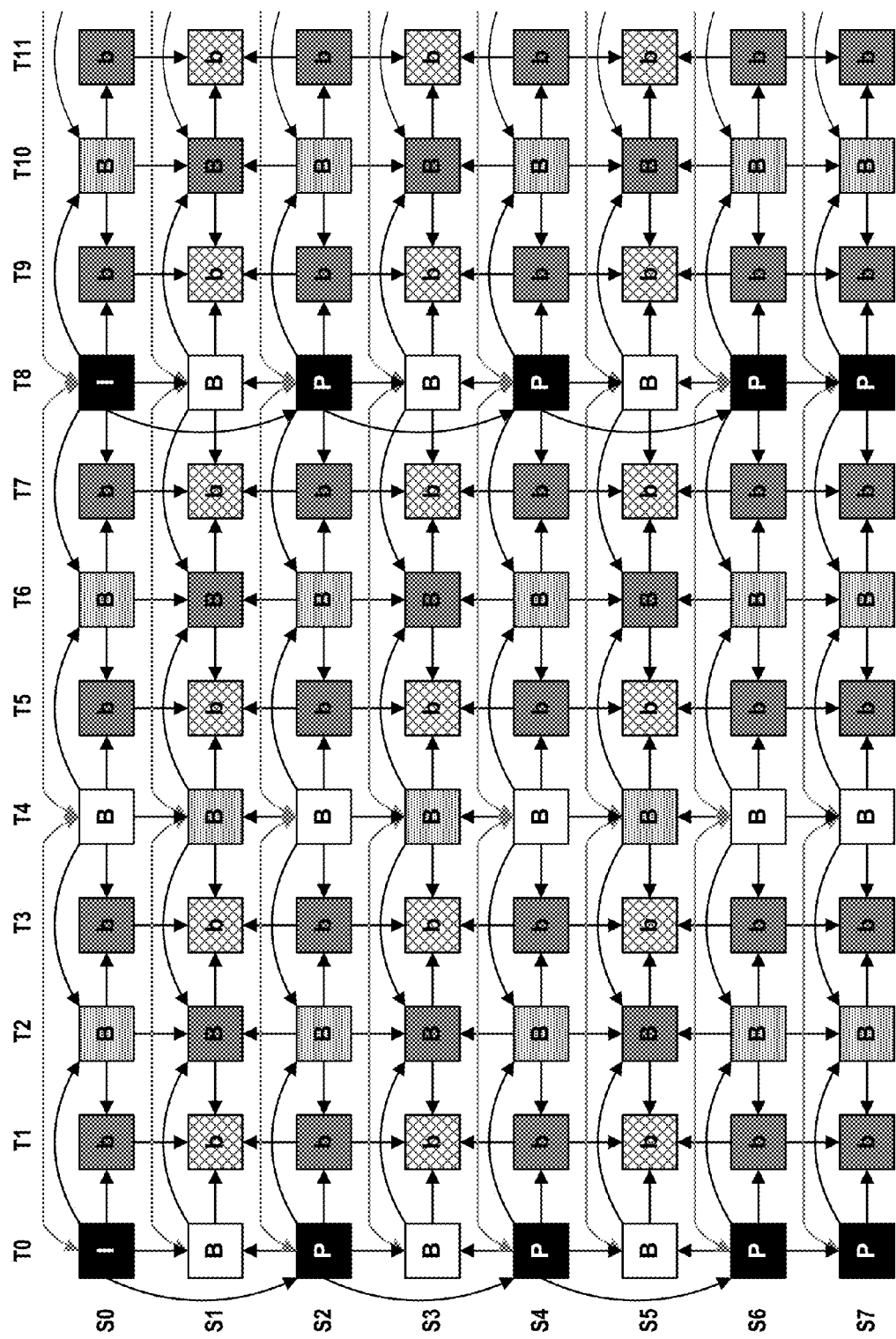
FIG. 8 is a conceptual diagram illustrating an example MVC prediction pattern.

FIG. 8 is a conceptual diagram illustrating an example MVC prediction pattern. A typical MVC prediction (including both inter-picture prediction within each view and inter-view prediction) structure for multi-view video coding is shown in FIG. 8, where predictions are indicated by arrows with the pointed-to object using the pointed-from object for prediction reference. In MVC, inter-view prediction is supported by disparity motion compensation, which uses the syntax of the H.264/AVC motion compensation, but allows a picture in a different view to be used as a reference picture when predicting a current picture to be encoded (which may be referred to as a "current picture" in this disclosure).

In some instances, MVC may support coding of two views. One of the advantages of MVC is that an MVC encoder can take more than two views as a three-dimensional (3D) video input and an MVC decoder can decode such a multiview representation. So any renderer that operates in conjunction with an MVC decoder may receive 3D video content with more than two views.

In MVC, inter-view prediction is allowed among pictures in the same access unit (which may refer to those pictures with the same time instance). When coding a picture in one of the non-base views, a picture may be added into a reference picture list, if it is in a different view but has the same time instance. An inter-view prediction reference picture can be put in any position of a reference picture list, just like any inter prediction reference picture.

Figure 9:
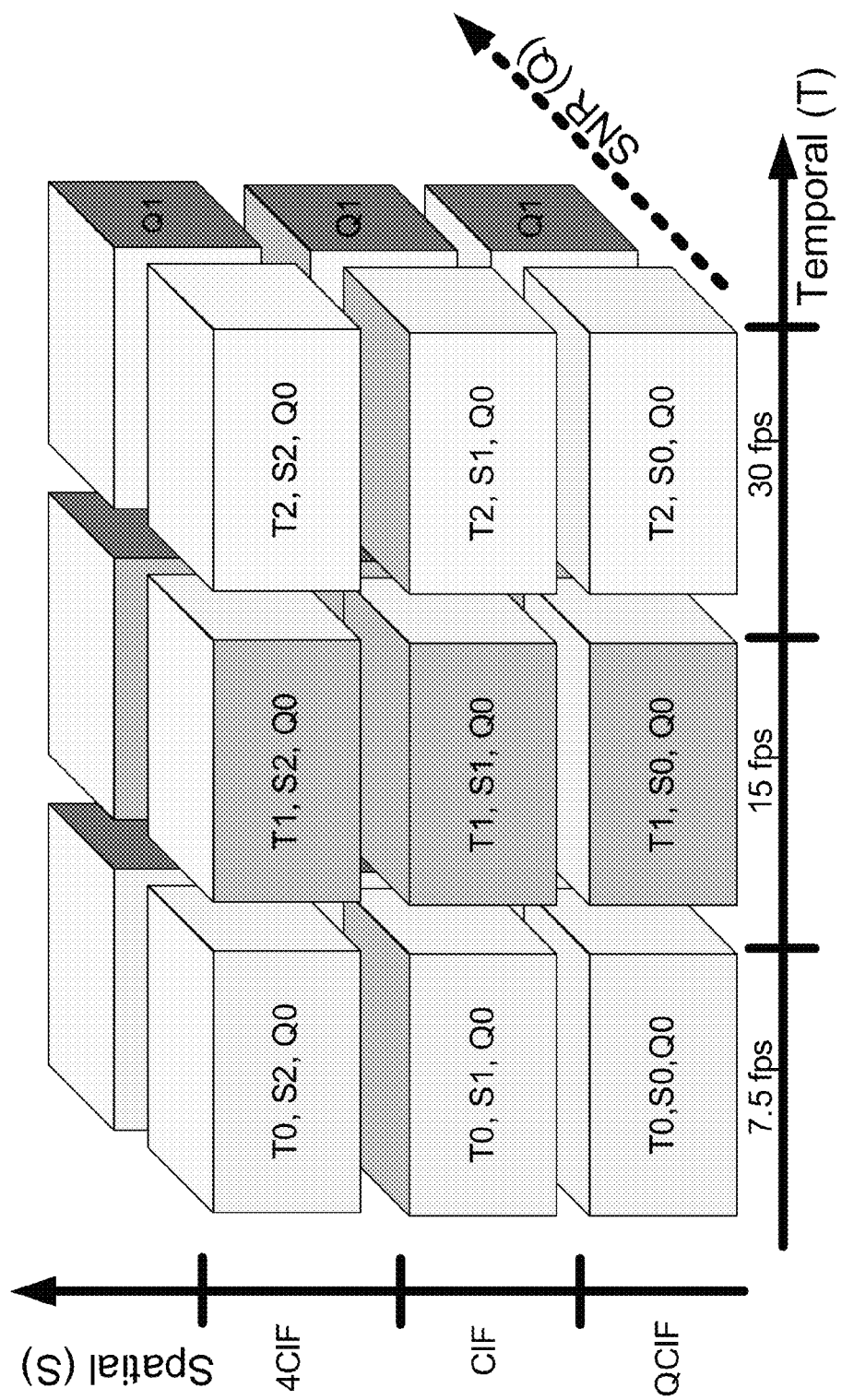
FIG. 9 is a conceptual diagram illustrating different dimensionas of scalability enabled by the scalable video coding (SVC) extension to H.264/AVC.

FIG. 9 is a conceptual diagram illustrating different dimensionas of scalability enabled by the scalable video coding (SVC) extension to H.264/AVC. In FIG. 9, layer zero may denote the base layer with layers one through four denoting enhancement layers. The SVC video data shown in the example of FIG. 9 may feature both spatial and temporal scalability. That is, the resolution (i.e., the number of pixels used to represent each picture) from the base layer (meaning, layer zero) to layer four may increase from QCIF (quarter common intermediate format) to 4CIF (which is four times CIF). In layer four, the frequency of pictures is also doubled from 15 hertz (Hz) to 30 Hz when compared to the frequency of layers zero through three (which are each at 15 Hz). Moreover, as shown by the arrows in FIG. 9, the layers below a given layer (in terms of their numbers) may be used to predict a picture in the higher layers. Although shown as being predicted from the picture directly below a given picture, the prediction may be based on pictures more than one layer below the current picture to be predicted in one of the enhancement layers.

Although not shown in FIG. 9 for ease of illustration purposes, arrows could be shown in FIG. 9 to denote same-layer prediction, which may be referred to as temporal prediction given that the pictures predicted from other pictures in the same view are temporally distant. Another dimension of scalability is also provided by SVC but not shown in FIG. 9, where this third dimension of scalability is in terms of quality (Q), often as measured by a signal to noise ratio between the compress, then decompressed version of the video data and the original video data.

In other words, as shown in FIG. 9, scalabilities are enabled in three dimensions. In the time dimension, frame rates with 7.5 Hz, 15 Hz or 30 Hz can be supported in a compliant video decoder by temporal scalability (T). When spatial scalability (S) is supported by the video decoder, resolutions of quarter common intermediate format (QCIF), common intermediate format (CIF) and four times CIF (4CIF) are enabled. For each specific spatial resolution and frame rate, the signal-to-noise-ratio (SNR) (Q) layers can be added to improve the picture quality. Once a SVC compliant video encoder has encoded the video content in such a scalable way, an extractor tool may be used to adapt the actual delivered content according to application requirements, which are dependent, e.g., on the clients or the transmission channel.

In the example shown in FIG. 9, each cubic contains the pictures with the same frame rate (temporal level), spatial resolution and SNR layers. Better representation can be normally achieved by adding those cubes (pictures) in any dimension. Combined scalability is supported when there are two, three or even more scalabilities enabled.

According to the SVC extension to H.264/AVC, the pictures with the lowest spatial and quality layer are compatible with H.264/AVC. The pictures in the lowest temporal level may form the temporal base layer, which can be enhanced with pictures in higher temporal levels. In addition to the H.264/AVC compatible layer, several spatial and/or SNR enhancement layers may be added to provide spatial and/or quality scalabilities. SNR scalability may also be referred to as "quality scalability." Each spatial or SNR enhancement layer itself may be temporally scalable, with the same temporal scalability structure as the H.264/AVC compatible layer. For one spatial or SNR enhancement layer, the lower layer this enhancement layer depends on is also referred to as the base layer of that specific spatial or SNR enhancement layer.

Figure 10:
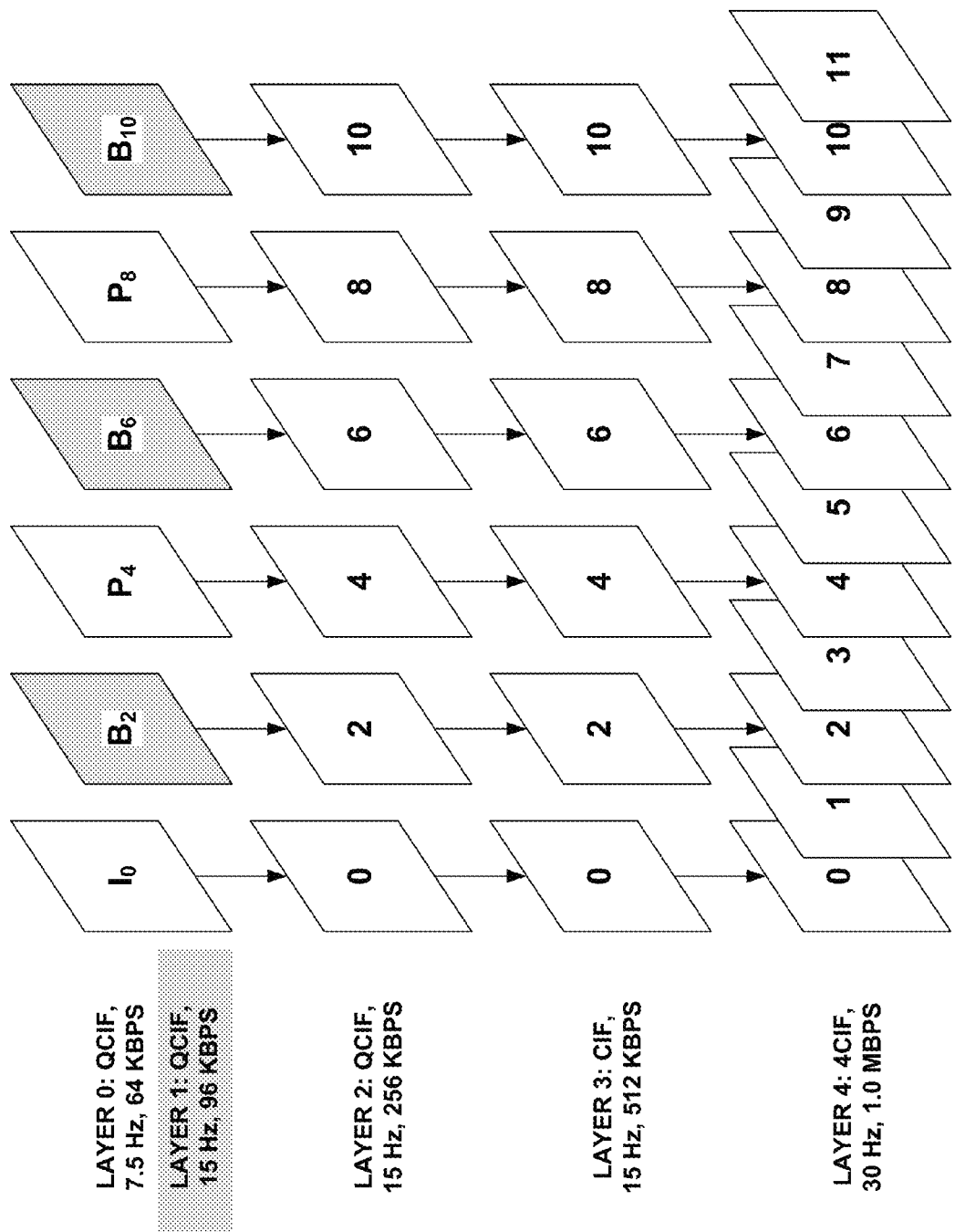
FIG. 10 is a conceptual diagram illustrating an example SVC coding structure.

FIG. 10 is a conceptual diagram illustrating an example SVC coding structure. The pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 10. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In the example, layer 3 is a SNR enhancement layer. As shown in the example of FIG. 10, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 11:
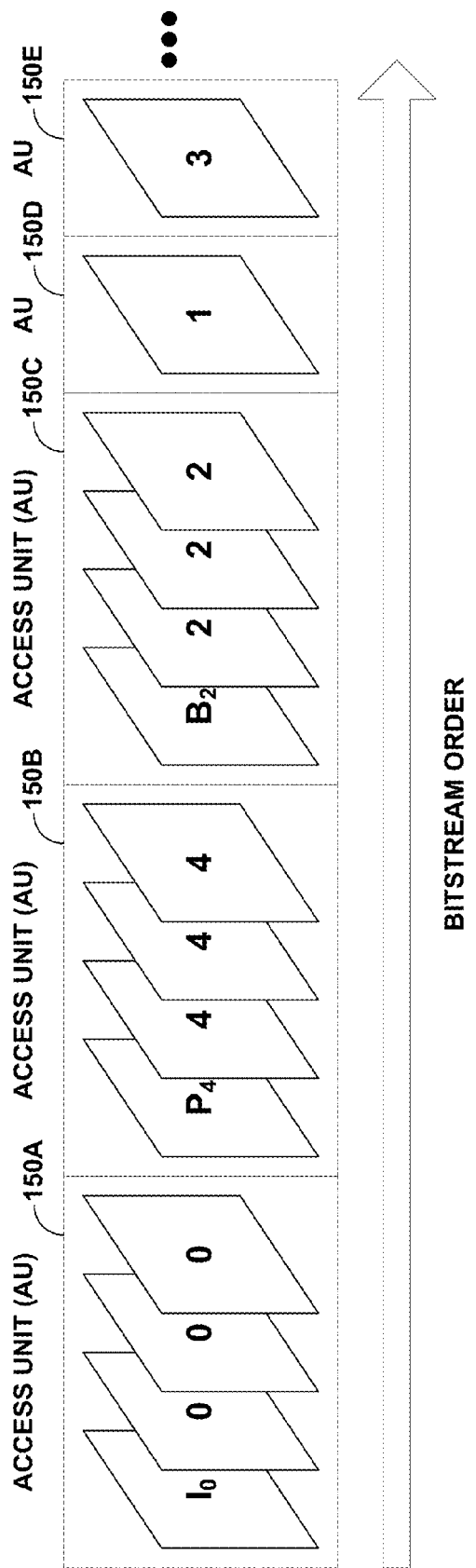
FIG. 11 is a conceptual diagram illustrating SVC access units in a bitstream.

FIG. 11 is a conceptual diagram illustrating how coded slices in a same time instance are successive in bitstream order and form one access unit in the context of SVC. Those SVC access units, denoted as access units (AUs) 150A-150E in the example of FIG. 11, then follow the decoding order, which could be different from the display order and decided e.g., by the temporal prediction relationship.

Some functionalities of SVC are inherited from H.264/AVC. Compared with previous scalable standards, one or more advantages of SVC may include hierarchical temporal scalability, inter-layer prediction, single-loop decoding, and flexible transport interface, each of which are reviewed below.

SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy, each of which is briefly introduced in the following paragraphs.

The coding mode using inter-layer texture prediction is called "IntraBL" mode in SVC. To enable single-loop decoding, only the macroblocks (MBs), which have co-located MBs in the base layer coded as constrained intra modes, may use inter-layer texture prediction mode. A constrained intra mode MB may be intra-coded without referring to any samples from the neighboring MBs that are inter-coded.

For inter-layer residual prediction, if an MB is indicated to use residual prediction, the co-located MB in the base layer for inter-layer prediction should be an inter MB and the corresponding residue may be upsampled according to the spatial resolution ratio. The residue difference between the enhancement layer and that of the base layer is typically coded.

For inter-layer motion prediction, the co-located base layer motion vectors may be scaled to generate predictors for the motion vectors of MB or MB partition in the enhancement layer. In addition, there is typically one MB type named base mode, which sends one flag for each MB. If this flag is true and the corresponding base layer MB is not intra, then motion vectors, partitioning modes and reference indices all may be derived from base layer.

In addition to reviewing MVC and SVC, a review of HEVC and multiview-HEVC ("MV-HEVC") is provided below. As described below in more detail, HEVC is a new video coding standard for which the base version (2D) is currently under development in JCT-VC. A primary usage of HEVC is seen in the area of high and ultra-high definition (UHD) video. Many HD displays already provide the capability for stereo rendering, and it is expected that the increased resolution and display size of UHD displays makes them even more suitable for such purposes. Beyond that, the improved compression capability of HEVC (expected half bit rate with same quality compared to AVC High profile) makes it attractive for the introduction of stereo. For example, by using mechanisms that exploit the redundancy between views, HEVC may be able to encode full resolution stereo at significantly lower rates than AVC would be capable just for one (monoscopic) view at the same quality and resolution.

Similar to AVC-based projects, a Joint Collaboration Team on 3D Video Coding (JCT-3V) of VCEG and MPEG is conducting a study of two 3DV solutions that are using the HEVC coding technology. The first is multi-view extension of HEVC, so called MV-HEVC and another is depth enhanced HEVC-based full 3DV codec referred to as 3D-HEVC. Part of the standardization efforts includes the standardization of multi-view/3D Video coding based on HEVC. The latest software 3D-HTM version 5.0 is electronically available at https://hevc.hhi.fraunhofer.de/svn/svn_3DVCSoftware/tags/HTM-5.0/. To further improve the coding efficiency, two new technologies, namely "inter-view motion prediction" and "inter-view residual prediction" (described below), have been adopted in the latest reference software.

Reviewing first reference picture list construction in HEVC, reference picture list construction for the first or the second reference picture list of a B picture typically includes two steps: reference picture list initialization and reference picture list reordering (modification). The reference picture list initialization may refer to an explicit mechanism that put the reference pictures in the reference picture memory (also known as a decoded picture buffer) into a list based on the order of picture order count (POC) values (which may be aligned with a display order of a picture). The reference picture list reordering mechanism may modify the position of a picture put in the list during the reference picture list initialization to any new position, or put any reference picture in the reference picture memory in any position even though the picture may not belong to the initialized list. Some pictures after the reference picture list reordering (or, in other words, modification) may be put in a position further down in the list that may be far from the initial position. However, if a position of a picture exceeds a number of active reference pictures of the list, the picture may not be considered as an entry of the final reference picture list. A video encoder may signal the number of active reference pictures in the slice header for each list. After reference picture lists are constructed (namely RefPicList0 and RefPicList1 if available), a video encoder may use a reference index to identify a picture in any reference picture list.

Next, a temporal motion vector predictor (TMVP) is commonly used to improve the coding efficiency of HEVC. Different from other coding tools, TMVP may require access to the motion vector of a frame in a decoded picture buffer, and in some instances, in a reference picture list.

To illustrate, in an inter-predicted slice, when the TMVP is enabled for the whole coded video sequence (that is, in some examples, when the sps_temporal_mvp_enable_flag in a sequence parameter set associated with a sequence of video pictures is set to 1), a slice_temporal_mvp_enable_flag is signaled in the slice header to indicate whether TMVP is enabled for the current slice.

When TMVP is enabled for the current slice and the current picture is a B slice, the video encoder may signal a collocated_from_l0_flag syntax element in the slice header to indicate whether the co-located picture is from RefPicList0 or RefPicList1.

After a reference picture list is identified, the video encoder may signal a collocated_ref_idx syntax element in slice header to identify the reference picture in the picture in the list.

A co-located prediction unit (PU) is then identified by checking the co-located picture. Either the motion of the right-bottom PU of the coding unit (CU) containing this PU, or the motion of the right-bottom PU within the center PUs of the CU containing this PU is used.

With respect to random access in HEVC, there are four picture types that can be identified by the NAL unit type in HEVC. These are the instantaneous decoding refresh (IDR) picture, the clean random access (CRA) picture, the temporal layer access (TLA) picture and the coded picture that is not an IDR, CRA or TLA picture.

The IDR and the coded pictures are picture types inherited from the H.264/AVC specification. The CRA and the TLA picture types are new in HEVC and not available in the H.264/AVC specification. The CRA picture may represent a picture type that facilitates decoding beginning from any random access point in the middle of a video sequence that is typically more efficient than inserting IDR pictures. In HEVC, the bitstream starting from these CRA pictures may also represent conforming bitstreams. The TLA picture may refer to a picture type that can be used to indicate valid temporal layer switching points. The following sections describe the CRA and TLA pictures in further detail.

In video applications, such as broadcasting and streaming, users may want to switch between different channels and to jump to specific parts of the video with minimum delay. This feature may be enabled by having random access pictures at regular intervals in the video bitstreams. The IDR picture, specified in both H.264/AVC and HEVC, can be used for random access. However, since an IDR picture starts a coded video sequence and always cleans the decoded picture buffer (DPB), pictures following the IDR in decoding order may not use pictures decoded prior to the IDR picture as reference. Consequently, bitstreams relying on IDR pictures for random access may have significantly lower coding efficiency (e.g., 6%). To improve the coding efficiency, the CRA pictures in HEVC allows pictures that follow the CRA picture in decoding order but proceed this picture in output order to use pictures decoded before the CRA picture as reference.

Figure 12:
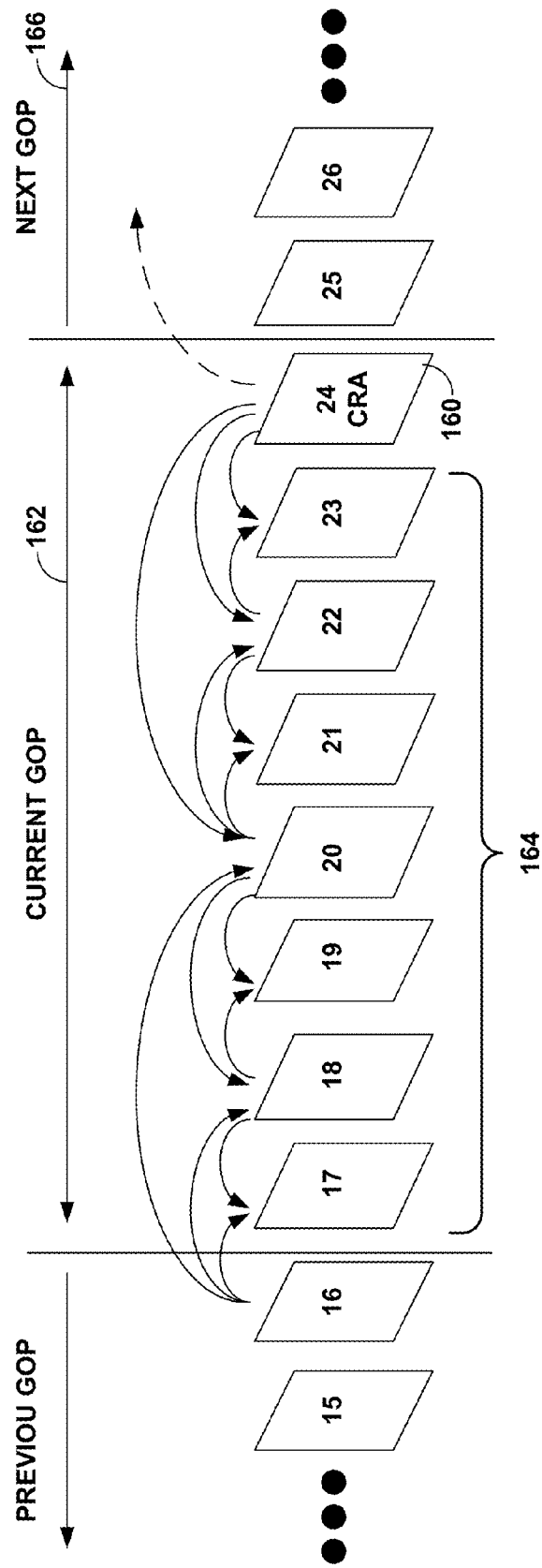
FIG. 12 is a conceptual diagram illustrating an example clean random access (CRA) picture and example leading pictures.

FIG. 12 is a conceptual diagram illustrating an example clean random access (CRA) picture and example leading pictures. A typical prediction structure around a CRA picture is shown in FIG. 12, where the CRA picture (with POC 24 and denoted as CRA picture 160) belongs to a Group of Pictures (GOP) 162, which contains other pictures (POC 17 through 23) 164, following CRA picture 160 in decoding order but preceding CRA picture 160 in output order. These pictures are called leading pictures 164 of CRA picture 160 and can be correctly decoded if the decoding starts from an IDR or CRA picture before current CRA picture 160. However, leading pictures may not be correctly decoded when random access from this CRA picture 160 occurs. As a result, these leading pictures are typically discarded during the random access decoding.

To prevent error propagation from reference pictures that may not be available depending on where the decoding starts, all pictures in the next GOP 166 as shown in FIG. 6, that follow CRA picture 160 both in decoding order and output order, should not use any picture that precedes CRA picture 160 either in decoding order or output order (which includes the leading pictures) as reference.

Similar random access functionalities are supported in H.264/AVC with the recovery point SEI message. An H.264/AVC decoder implementation may or may not support the functionality. In HEVC, a bitstream starting with a CRA picture is considered as a conforming bitstream. When a bitstream starts with a CRA picture, the leading pictures of the CRA picture may refer to unavailable reference pictures and therefore may not be correctly decoded. However, HEVC specifies that the leading pictures of the starting CRA picture are not output, hence the name "clean random access." For establishment of bitstream conformance requirement, HEVC specifies a decoding process to generate unavailable reference pictures for decoding of the non-output leading pictures. However, conforming decoder implementations do not have to follow that decoding process, as long as these conforming decoders can generate identical output compared to when the decoding process is performed from the beginning of the bitstream.

In HEVC, a conforming bitstream may contain no IDR pictures at all, and consequently may contain a subset of a coded video sequence or an incomplete coded video sequence.

Besides the IDR and CRA pictures, there are other types of random access point pictures, e.g., broken link access (BLA) picture. For each of the major types of the random access point pictures, there might be sub-types, depending on how a random access point picture could be potentially treated by systems. Each sub-type of random access point picture has a different NAL unit type.

With respect to motion compression in HEVC, in order to enable the decoder to be implemented such that less memory may need be dedicated to the decoded picture buffer (DPB), motion compression is introduced in HEVC to compress the motion field in a way that each block of a picture may, if in a 16×16 block raster scan order as one example, hypothetically contains a same first motion vector (if available) for RefPicList0 and a same second motion vector (if available) for RefPicList1. This motion compression may apply to all temporal reference pictures so that the amount of memory allocated to the DPB may be decreased. In this disclosure, each of the 16×16 blocks may be referred to as an "aligned 16×16 block".

In the current HEVC specification, however, a motion field may be done in real-time or near-real-time such that, when accessing any 4×4 block inside an aligned 16×16 block, the motion vector of the top-left corner block within the aligned 16×16 block may be used.

This design requires coding unit (CU) level processes to handle the motion compression in real-time although a more advanced decoder may handle this motion compression at the picture level.

With respect to multi-view (MV)-HEVC in JCT-3V, MV-HEVC may be formed such that no coding unit level or lower level changes are required for the implementation of MV-HEVC, when an HEVC implementation is available.

With respect to random access in MV-HEVC, the random access concept of HEVC is extended to the multiview and 3DV extensions. Detailed definitions of the random access point access units as well as the random access view component were in the MV-HEVC working draft specification: JCT3V-A1004, entitled "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 and available at http://phenix.it-sudparis.eu/jct2/doc_end_user/documents/1_Stockholm/wg11/JCT3V-A1004-v1.zip. Detailed definitions of the random access point access units as well as the random access view component were in the MV-HEVC working draft specification noted directly above, i.e., JCT3V-A1004.

Whether a view component is a random access point or not depends on the NAL unit type of the view component. If the type belongs to those defined in HEVC base specification for random access point pictures, the current view component is a random access point view component (or, for simplicity, random access point picture of the current view).

In some instances, the random access functionality only applies to the temporal prediction in a way that certain predictions in the temporal dimension (thus inside a view) is either disabled or constrained similarly as in HEVC base specification. However, inter-view prediction for a random access point view component is still possible, and generally performed to improve coding efficiency, similar to the anchor picture in H.264/MVC. A random access point (RAP) view component, if using inter-view prediction, may be a P or B picture. In some instances, this above noted concept can be extended to the scalable extension of HEVC or "toward HEVC" multi-standard codec, described below.

With respect to inter-view reference picture list in MV-HEVC, a video coder (which is a general term to refer to either one of or both of a video encoder and/or a video decoder) may create an inter-view reference picture based on the view dependency signaled in the video parameter set (VPS). For a current picture, pictures that are in the same access unit and belong to the dependent views (signaled in VPS) may form an inter-view reference picture list. A picture in an inter-view reference picture list may be added into a reference picture list of the current picture.

With respect to hypertext transfer protocol (HTTP) live streaming (HLS)-only HEVC based scalable coding, in an HLS-only HEVC, when the two spatial layers have the same spatial resolution, inter-view prediction can be supported similar to MV-HEVC, wherein TMVP is enabled even when the co-located picture is from a different view.

In an HLS-only scalable HEVC codec, there should be no changes equal or below the coding unit level. Typically, in such a coder/decoder (which is often referred to as a "codec"), a base layer picture (after possible upsampling) may be inserted into a reference picture list and may be used as a reference picture. This may be similar to an inter-view reference picture in MV-HEVC. Furthermore, multiple representations of the base layer pictures, e.g., generated with different (upsampling) filters, may be added into a same reference picture list.

The decoding process of inter-layer reference picture generation, however, is considered as a picture level decoding process. Thus if designed in a lightweight fashion, this decoding process may represent the only potential additional hardware module for the scalable codec, assuming an HEVC hardware design is available.

In this HLS-only scalable codec, an inter-layer reference picture list, similar to the inter-view reference picture list may be created and the entries in the inter-layer reference picture list may be added into reference picture lists.

Accordingly, with respect to HLS-based scalable/multiview codec with advanced technologies, there is not currently a standard scalable codec, compatible with HEVC but that supports advanced coding tools. Possible advanced coding tools could be those in SVC with/without further improvements.

The techniques of this disclosure described in detail above may avoid block level changes to emerging video coding standards by operating at the picture level to generate the difference signal (while various forms of advanced residual prediction only operated on a block-by-block basis to generate the difference signal). This difference signal may then be stored to the reference picture list in the manner described above, often by shifting pixel values of the difference picture to a specified positive-only range of values. Moreover, to the extent advanced residual prediction relies on motion information, the techniques enable the video coding device to perform a modified form of bi-prediction in which the motion information for the difference picture is equivalent to the motion information associated with the current picture. Each of the above aspects of the techniques may effectively enable the video coding device to mimic application of advanced residual prediction by modifying bi-prediction in the above noted ways, each of which require little to no block-level changes to the emerging video coding standards.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding scalable or multi-view video data, the method comprising:
    determining a difference picture, for a current picture, by setting each pixel value of the difference picture to be a corresponding pixel value in the same pixel position of a first reference picture in a same layer or view as the current picture subtracted by a corresponding pixel value in the same pixel position of a decoded picture in a different layer or view as the current picture, wherein the decoded picture is in a same access unit as the first reference picture;
    storing the difference picture; and
    performing bi-prediction to predict a current block of the current picture from the difference picture and a second reference picture at a same layer or view as the current picture,
    wherein performing the bi-prediction comprises:
        applying explicit weight prediction for the current picture;
        applying a first prediction weight to the difference picture; and
        applying a second prediction weight to the second reference picture.

2. The method of claim 1,
    wherein at least one of original values of pixels of the difference picture are less than zero,
    wherein determining the difference picture comprises shifting the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture, and
    wherein the method further comprises, prior to performing the bi-prediction, shifting the shifted values for each of the pixels back to recover the original values for each of the pixels of the difference picture.

3. The method of claim 1, wherein storing the difference picture comprises storing the difference picture to a first reference picture list, and
    wherein the second reference picture is stored to a second reference picture list.

4. The method of claim 1, further comprising, prior to performing the bi-prediction, applying the second prediction weight to the second reference picture, the second prediction weight being equal to one.

5. The method of claim 1, wherein the first prediction weight for the difference picture is the same as the second prediction weight for the second reference picture.

6. The method of claim 1, wherein the first prediction weight for the difference picture is equal to half of the second prediction weight for the second reference picture.

7. The method of claim 1, wherein determining the difference picture further comprises:
    multiplying the first reference picture by a weight equal to two to generate a weighted first reference picture; and
    determining the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

8. The method of claim 1,
    wherein storing the difference picture comprises storing two or more copies of the difference picture or a derivation thereof to a first reference picture list,
    wherein the second reference picture is stored to a second reference picture list, and
    wherein performing bi-prediction comprises performing bi-prediction for the current block of the current picture based on one of the two or more multiple copies of the difference picture stored to the first reference picture list and the second reference picture at the same layer or view as the current picture stored to the second reference picture list.

9. The method of claim 1, further comprising determining motion information for the difference picture to be equivalent to motion information of the first reference picture of the current picture when temporal motion vector prediction is from the difference picture.

10. A method of encoding scalable or multi-view video data, the method comprising:
    determining a difference picture, for a current picture, by setting each pixel value of the difference picture to be a corresponding pixel value in the same pixel position of a first reference picture in a same layer or view as the current picture subtracted by a corresponding pixel value in the same pixel position of a decoded picture in a different layer or view as the current picture, wherein the decoded picture is in a same access unit as the first reference picture; and storing the difference picture; and performing bi-prediction to predict a current block of the current picture from the difference picture and a second reference picture at a same layer or view as the current picture, wherein performing the bi-prediction comprises:
applying explicit weight prediction for the current picture;
applying a first prediction weight to the difference picture; and
applying a second prediction weight to the second reference picture.

11. The method of claim 10,
wherein at least one of original values of pixels of the difference picture are less than zero,
wherein determining the difference picture comprises shifting the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture, and
wherein the method further comprises, prior to performing the bi-prediction, shifting the shifted values for each of the pixels back to recover the original values for each of the pixels of the difference picture.

12. The method of claim 10,
wherein storing the difference picture comprises storing the difference picture to a first reference picture list,
wherein the second reference picture is stored to a second reference picture list.

13. The method of claim 10, further comprising, prior to performing the bi-prediction, applying the second prediction weight to the second reference picture, the second prediction weight being equal to one.

14. The method of claim 10, wherein the first prediction weight for the difference picture is the same as the second prediction weight for the second reference picture.

15. The method of claim 10, wherein the first prediction weight for the difference picture is equal to half of the second prediction weight for the second reference picture.

16. The method of claim 10, wherein determining the difference picture further comprises:
multiplying the first reference picture by a weight equal to two to generate a weighted first reference picture; and
determining the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

17. The method of claim 10,
wherein storing the difference picture comprises storing two or more copies of the difference picture or a derivation thereof to a first reference picture list,
wherein the second reference picture is stored to a second reference picture list, and
wherein performing bi-prediction comprises performing bi-prediction for the current block of the current picture based on one of the two or more multiple copies of the difference picture stored to the first reference picture list and the second reference picture at the same layer or view as the current picture stored to the second reference picture list.

18. The method of claim 10, further comprising determining motion information for the difference picture to be equivalent to motion information of the first reference picture of the current picture when temporal motion vector prediction is from the difference picture.

19. A device configured to code scalable or multi-view video data, the device comprising:
one or more processors configured to
determine a difference picture, for a current picture, by setting each pixel value of the difference picture to be a corresponding pixel value in the same pixel position of a first reference picture in a same layer or view as the current picture subtracted by a corresponding pixel value in the same pixel position of a decoded picture in a different layer or view as the current picture, wherein the decoded picture is in a same access unit as the first reference picture;
store the difference picture; and
perform bi-prediction to predict a current block of the current picture from the difference picture and a second reference picture at a same layer or view as the current picture,
wherein the one or more processors are configured to perform the bi-prediction by at least in part:
applying explicit weight prediction for the current picture;
applying a first prediction weight to the difference picture; and
applying a second prediction weight to the second reference picture; and
a memory configured to store the difference picture.

20. The device of claim 19,
wherein at least one of original values of pixels of the difference picture are less than zero,
wherein the one or more processors are further configured to, when determining the difference picture, shift the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture, and
wherein the one or more processors are further configured to, prior to performing the bi-prediction, shift the shifted values for each of the pixels back to recover the original values for each of the pixels of the difference picture.

21. The device of claim 19,
wherein the one or more processors are configured to store the difference picture to a first reference picture list, and
wherein the one or more processors are further configured to store the second reference picture to a second reference picture list.

22. The device of claim 19, wherein the one or more processors are further configured to, prior to performing the bi-prediction, apply the second prediction weight to the second reference picture, the second prediction weight being equal to one.

23. The device of claim 19, wherein the first prediction weight for the difference picture is the same as the second prediction weight for the second reference picture.

24. The device of claim 19, wherein the first prediction weight for the difference picture is equal to half of the second prediction weight for the second reference picture.

25. The device of claim 19, wherein the one or more processors are further configured to, when determining the difference picture, multiply the first reference picture by a weight equal to two to generate a weighted first reference picture, and determine the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

26. The device of claim 19,
wherein the one or more processors are configured to store two or more copies of the difference picture or a derivation thereof to a first reference picture list, and
wherein the one or more processors are further configured to store the second reference picture list to a second reference picture list, and
wherein the one or more processors are configured to perform bi-prediction for the current block of the current picture based on one of the two or more multiple copies of the difference picture stored to the first reference picture list and the second reference picture at the same layer or view as the current picture stored to the second reference picture list.

27. The device of claim 19, wherein the one or more processors are further configured to determine motion information for the difference picture to be equivalent to motion information of the first reference picture of the current picture when temporal motion vector prediction is from the difference picture.

28. A device configured to code scalable or multi-view video data, the device comprising:
means for determining a difference picture, for a current picture, by setting each pixel value of the difference picture to be a corresponding pixel value in the same pixel position of a first reference picture in a same layer or view as the current picture subtracted by a corresponding pixel value in the same pixel position of a decoded picture in a different layer or view as the current picture, wherein the decoded picture is in a same access unit as the first reference picture;
means for storing the difference picture; and
means for performing bi-prediction to predict a current block of the current picture from the difference picture and a second reference picture at a same layer or view as the current picture,
wherein the means for performing the bi-prediction comprises:
means for applying explicit weight prediction for the current picture;
means for applying a first prediction weight to the difference picture; and
means for applying a second prediction weight to the second reference picture.

29. The device of claim 28,
wherein at least one of original values of pixels of the difference picture are less than zero,
wherein the means for determining the difference picture comprises means for shifting the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture, and
wherein the device further comprises, prior to performing the bi-prediction, means for shifting the shifted values for each of the pixels back to recover the original values for each of the pixels of the difference picture.

30. The device of claim 28,
wherein the means for storing comprises means for storing the difference picture to a first reference picture list, and
wherein the second reference picture is stored to a second reference picture list.

31. The device of claim 28, further comprising, prior to performing the bi-prediction, means for applying the second prediction weight to the second reference picture, the second prediction weight being equal to one.

32. The device of claim 28, wherein the first prediction weight for the difference picture is the same as the second prediction weight for the second reference picture or the first prediction weight for the difference picture is equal to half of the second prediction weight for the second reference picture.

33. The device of claim 28, wherein the means for determining the difference picture further comprises:
means for multiplying the first reference picture by a weight equal to two to generate a weighted first reference picture; and
means for determining the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

34. A non-transitory computer-readable storage medium having storing thereon instructions that, when executed, cause one or more processors of a device configured to code scalable or multi-view video data to:
determine a difference picture, for a current picture, by setting each pixel value of the difference picture to be a corresponding pixel value in the same pixel position of a first reference picture in a same layer or view as the current picture subtracted by a corresponding pixel value in the same pixel position of a decoded picture in a different layer or view as the current picture, wherein the decoded picture is in a same access unit as the first reference picture;
store the difference picture; and
perform bi-prediction to predict a current block of the current picture from the difference picture and a second reference picture at a same layer or view as the current picture,
wherein the one or more processors are configured to perform the bi-prediction by at least in part:
applying explicit weight prediction for the current picture;
applying a first prediction weight to the difference picture; and
applying a second prediction weight to the second reference picture.

35. The non-transitory computer-readable storage medium of claim 34,
wherein at least one of original values of pixels of the difference picture are less than zero,
wherein the instruction that when executed cause the one or more processors to determine the difference picture comprise instructions that when executed cause the one or more processors to shift the original values for each of the pixels of the difference picture to generate shifted values for each of the pixels that are greater than or equal to zero and to set pixel values of the difference picture so that the pixel values of the difference pixel belong to a same range and a same bit depth as the pixel values of the current picture, and wherein the non-transitory computer-readable storage medium further comprises instructions that when executed cause the one or more processors to, prior to performing the bi-prediction, shift the shifted values for each of the pixels back to recover the original values for each of the pixels of the difference picture.

36. The non-transitory computer-readable storage medium of claim 34, further comprising instructions that when executed cause the one or more processors to:

store the difference picture to a first reference picture list, wherein the second reference picture is stored to a second reference picture list.

37. The non-transitory computer-readable storage medium of claim 34, further comprising instructions that when executed cause the one or more processors to, prior to performing the bi-prediction, apply the second prediction weight to the second reference picture, the second prediction weight being equal to one.

38. The non-transitory computer-readable storage medium of claim 34, wherein the first prediction weight for the difference picture is the same as the second prediction weight for the second reference picture or the first prediction weight for the difference picture is equal to half of the second prediction weight for the second reference picture.

39. The non-transitory computer-readable storage medium of claim 34, wherein the instruction that when executed cause the one or more processors to determine the difference picture comprise instructions that when executed cause the one or more processors to:

multiply the first reference picture by a weight equal to two to generate a weighted first reference picture; and determine the difference picture, for the current picture, based on the weighted first reference picture and the decoded picture, wherein each pixel value of the difference picture is set to be the corresponding pixel value in the same pixel position of the weighted first reference picture subtracted by the corresponding pixel value in the same pixel position of the decoded picture.

* * * * *